US006853870B2

(12) United States Patent
Harakawa et al.

(10) Patent No.: US 6,853,870 B2
(45) Date of Patent: Feb. 8, 2005

(54) SEMICONDUCTOR PROCESSING PROCESS CONTROL SYSTEM AND ITS CONTROL METHOD

(75) Inventors: Shoichi Harakawa, Yokohama (JP); Makoto Ikeda, Yokohama (JP); Etsuo Fukuda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/815,657

(22) Filed: Apr. 2, 2004

(65) Prior Publication Data

US 2004/0186610 A1 Sep. 23, 2004

Related U.S. Application Data

(62) Division of application No. 09/606,173, filed on Jun. 29, 2000, now Pat. No. 6,745,094.

(30) Foreign Application Priority Data

Jun. 30, 1999 (JP) .......................................... 11-186523

(51) Int. Cl.[7] .............................................. G06F 19/00
(52) U.S. Cl. ....................... 700/103; 700/104; 700/121
(58) Field of Search ............................. 700/121, 86, 87, 700/108, 103, 104, 109, 99, 100, 102

(56) References Cited

U.S. PATENT DOCUMENTS

| 5,694,325 | A | | 12/1997 | Fukuda et al. | ............... 700/121 |
| 5,740,065 | A | | 4/1998 | Jang et al. | ................... 364/488 |
| 5,898,588 | A | * | 4/1999 | Morimoto | .................... 700/108 |
| 6,263,255 | B1 | | 7/2001 | Tan et al. | .................... 700/121 |
| 6,385,496 | B1 | | 5/2002 | Irwin et al. | .................... 700/87 |
| 6,399,511 | B2 | | 6/2002 | Tang et al. | ................. 438/714 |
| 6,505,090 | B1 | * | 1/2003 | Harakawa | ................... 700/121 |

FOREIGN PATENT DOCUMENTS

| JP | 6-196404 | 7/1994 |
| JP | 8-45804 | 2/1996 |
| JP | 10-256241 | 9/1998 |

OTHER PUBLICATIONS

Etsuo Fukuda, et al., "Advancd Process Control System Description of an Easy–To–Use Control System Incorporatring Pluggable Modules," IEEE International Symposium on Semiconductor Manufacturing, Jun. 1999, pp. 321–324.

\* cited by examiner

*Primary Examiner*—Leo Picard
*Assistant Examiner*—Steven R. Garland
(74) *Attorney, Agent, or Firm*—Oblon, Spivak, McClelland, Maier & Neustadt, P.C.

(57) ABSTRACT

A semiconductor processing process control system comprising a skip judgment request receiving section for receiving a request for judgment as to whether a process can be skipped or not. A skip judgment yes/no section searches for a judgment plug-in corresponding to the process to be skipped and a judgment execute section activates the judgment plug-in to make a judgment as to whether the process can be skipped or not on the basis of skip judgment logic in the plug-in. A skip execute section effects skipping of the process if the judgment determines that the process can be skipped.

4 Claims, 28 Drawing Sheets

```
CONTROL VARIABLE
COMPUTATION PROGRAM: α  (OX001/AAA)
//ACQUIRE "PROCESSING TIME" AS PROCESS
MANAGING INFORMATION AND SUBSTITUTE IT FOR TEMP
TEMP=GET(PROCESSING TIME);

//SET THE VALUE OF TEMP FOR CONTROL VARIABLE
"TIME",AND TRANSFER IT TO THE APPARATUS
SEND (TIME ,TEMP);
```

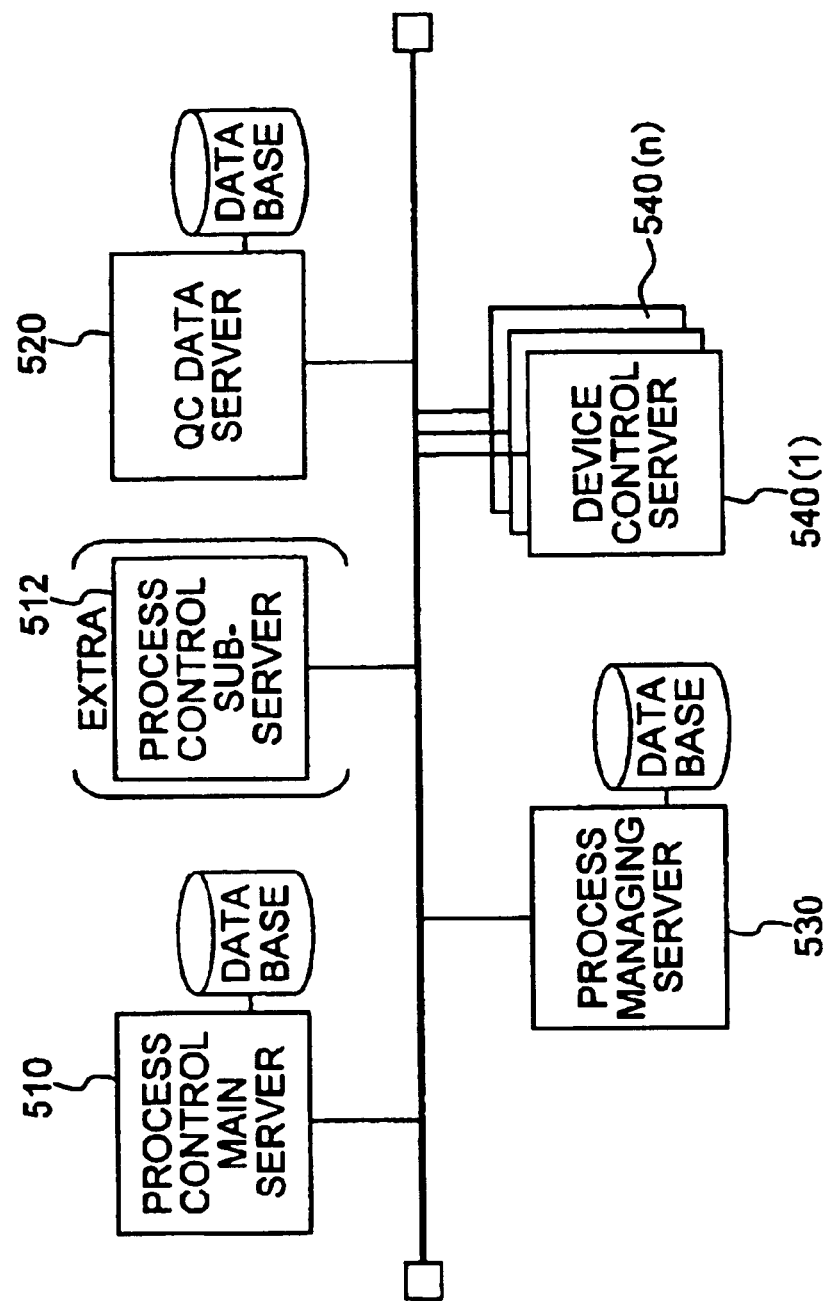

ACTUAL PROCESSING TOTALING PROGRAM δ

//READ VALUE INTO ARRAY TEMP [] FROM COMMON DATA STORAGE REGION "ARRAY []"
COM_SAVE(DUST[],TEMP[]);

//STATISTICALLY JUDGE THE VALUE OF TEMP[] BY EXTERNAL FUNCTION AND SUBSTITUTE THE RESULT FOR RETURN
return=SPC_JUDGE(temp[]);

//SEND RESULT OF JUDGEMENT TO PROCESS MANAGER TO OMIT A STEP PM_SEND(return);

---

ACTUAL PROCESSING TOTALING PROGRAM ε (DS001/FFF)

//ACQUIRE VALUE OF "DUST" AS PROCESS DATA AND SUBSTITUTE IT FOR TEMP
TEMP=GET (DUST)

//STORE THE VALUE OF TEMP IN COMMON DATA STORAGE REGION "DUST[]"
COM_SAVE(dust[].temp);

---

PROCESS-TO-PROCESS CONTROL PROGRAM:B

/DEFINE PROGRAM FOR TOTALING ACTUAL PROCESSING OF CLEANSING PROCESS
PROGRAM_DEFINE(δ);

//DEFINE PROGRAM FOR TOTALING ACTUAL PROCESSING OF DUST INSPECTION PROCESS
PROGRAM_DEFINE(ε);

//DEFINE "ARRAY DUST[]" IN COMMON DATA STORAGE REGION
COM_DEFINE(dust[]);

FIG. 18

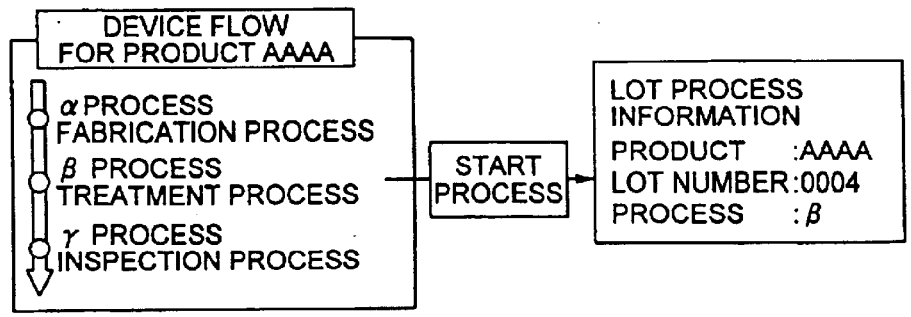
FIG. 22
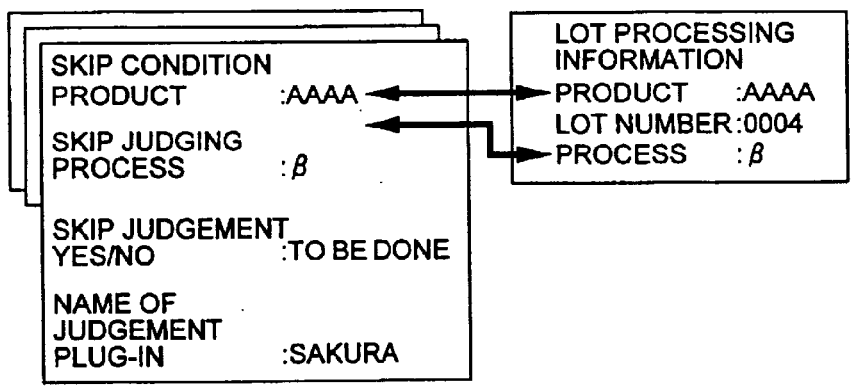
FIG. 23
```
JUDGEMENT PLUG-IN :SAKURA
INPUT    :A=PRODUCT,B=SKIP JUDGING PROCESS
OUTPUT :R=RESULT OF JUDGEMENT
LOGIC    :ACQUIRE TYPE OF JUDGEMENT QC STEP C,
          DATA D TO BE JUDGED, AND SPECS E,F & G
          FOR PRODUCT A AND SKIP JUDGING
          PROCESS B FROM SPEC DB EXCLUSIVE TO
          JUDGEMENT PLUG-IN SAKURA, AND IF
          F<SPEC D<G FOR E CONSECUTIVE TIMES,
          SUBSTITUTE "EXECUTE STEP SKIP" FOR R.
```
FIG. 24

(1) EXAMPLE OF DEPOSITION APPARATUS

| SiO2 3000A |
| Si3N4 1000A |
| PolySi 2000A |
| SiO2 500A |

PROCESS SPECIFICATION PARAMETER

FILM=SiO2-POLY-SiN-SiO2
THICK=500A-2000A-1000A-3000A
RECIPE=A1

RECIPE MANAGING TABLE (A1)

| STEP | 1 | 2 | 3 | 4 |
|---|---|---|---|---|
| CONDITION | Depo1 | Depo2 | Depo3 | Depo4 |

RATE TABLE

| CONDITION | Depo1 | Depo2 | Depo3 | Depo4 |
|---|---|---|---|---|
| Rate (A/min) | 1234.5 | 2345.6 | 3456.7 | 4567.8 |

$$Time = \frac{Thickness}{DepoRate(Condition)}$$

CONTROL VARIABLE OUTPUT RESULT

| STEP | 1 | 2 | 3 | 4 |
|---|---|---|---|---|
| TIME (sec) | 500/1234.5*60 =24 | 2000/2345.6*60 =51 | 1000/3456.7*60 =17 | 3000/4567.8*60 =39 |

FIG. 31 PRIOR ART

SEMICONDUCTOR PROCESSING PROCESS CONTROL SYSTEM AND ITS CONTROL METHOD

RELATED APPLICATION

This application is a division of and claims the benefit of priority under 35 U.S.C. 120 from U.S. Ser. No. 09/606,173, filed Jun. 29, 2000, now U.S. Pat. No. 6,745,094, and claims the benefit of priority under 35 U.S.C. 119 of Japanese Patent Application No. H11-186523, filed on Jun. 30, 1999, the entire contents of which are incorporated herein by reference.

BACKGROUND OF THE INVENTION

1. Field of the Invention

This invention relates to a system and a method for semiconductor processing process control, and more particularly, to a semiconductor processing process control system capable of flexibly, quickly coping with changes in processing process, method of computing control variables and processing equipment, and its control method.

2. Description of the Related Background Art

For manufacturing semiconductor devices such as IC, LSI, and so on, they undergo many processes like etching, cleansing, inspection, and others, and intended processing is conducted in each process. For realizing intended processing, control conditions each processing apparatus and its processing time must be adjusted appropriately.

For example, in case of stacking a film in a certain process, material of the film (film material) and its thickness are targets of the processing. The content of this processing is to make a film of an intended material on a specific semiconductor. Only when control conditions of the deposition apparatus (in case of a CVD apparatus, the are conditions on the material of the gas, flow rate of the gas, temperature, etc.) are selected properly, the intended content of the processing (making a film of an intended material) can be realized, and the film thickness can be controlled by adjusting the duration of time of the deposition (deposition time). The deposition time can be obtained by dividing the target film thickness by the deposition rate (film thickness stacked in a unit time, namely, a kind of processing speed). Such deposition rates are previously measured upon maintenance of the apparatus, for example, and held in form of a rate table.

When etching processing is conducted, the content of the processing is to etch a film of a specific material stacked on a specific semiconductor, and this processing content and the etching depth (film thickness) are the target of the processing. To realize this content of the processing, control conditions of an etching apparatus are determined. Further, the etching time (processing time) is determined by dividing the target etching depth (thickness) by the etching rate (etching depth in each unit time, i.e., a kind of processing speed). Such etching rates are held as a rate table similarly to the case of deposition of films.

To supervise control conditions of processing apparatuses and processing times in a plurality of processes, a semiconductor processing process control system is used. Taking here deposition of a film (as a single process) as an example of processing content, a flow of process control by a conventional semiconductor processing process control system is shown. The process flow is shown in FIG. 29, and the flow of process control is shown in FIG. 30.

As shown in FIG. 30, a semiconductor processing process control system CS1 reads out the processing target (in this case, material and thickness of the film to be stacked) of the process and control conditions of a processing apparatus from process flow information IF1. Then, the semiconductor processing process control system CS1 obtains the processing time (in this case, deposition time) by referring to a rate table RT1 and dividing the target film thickness by the deposition rate. In this example, 100 minutes obtained by dividing 1000 angstrom as the target film thickness by 10 angstrom/min. as the deposition rate is the deposition time. Then, it sends the control variables (setting of conditions concerning control of the processing apparatus involving both control conditions of the processing apparatus and its processing time, also in the description made hereunder) to the processing apparatus PA1 like a deposition apparatus or its control device, for example. In the example shown in FIG. 30, the control method for the target process is a fixed method.

FIGS. 31 and 32 show method of computing the processing time upon stacking a plurality of films and the processing time upon etching a plurality of films. In this case, since control conditions and processing speed (deposition rate, etching rate, etc.) of the processing apparatus PA1 vary with materials of films to be stacked or etched, processing time must be calculated for each step for processing each film.

The semiconductor processing process control system CS1 may be made up of hardware alone. Normally, however, it can be made as programs on a computer (software) to ensure quick response to changes in process, etc. This is shown in FIG. 33.

As shown in FIG. 33, there are process control programs CPG for respective processing apparatuses PA1 through PA4 used for respective processes, and these programs control the processing apparatuses PA1 through PA4. That is, a set of a plurality of process control programs CPG realizes the function of the semiconductor processing process control system CS1. When the process and the apparatus there for are changed from one to another, the system can copes with it by changing the content of the respective process control programs CPG.

However, there is the problem that control conditions are not fixed ones determined only by processing apparatuses PA1 through PA4 and processing contents and deposition rate is not always constant.

That is, control conditions are variable with the history of use of each processing apparatus. Additionally, deposition rate may change depending on the status of the base on which a target film should be stacked. Therefore, it is possible that the deposition rate varies with thickness of the stacked film.

As a method dealing with this problem, Japanese Patent Laid-Open Publication No. hei 8-45804 discloses a method for computing appropriate control conditions taking the past control conditions into consideration, and Japanese Patent Laid-Open Publication No. hei 6-196404 discloses a method for computing a processing time from a target film thickness.

These methods for computing control conditions and processing time are not always fixed but may vary with target processing contents and other factors. Conventional semiconductor processing process control systems, however, could not flexibly cope with changes in calculation method of control conditions and processing time, and were compelled to re-make the whole program every time upon changing the calculation method.

Furthermore, conventional systems involved the problem that they needed a change of the whole program also upon every change of the processing apparatus and process (not only a change of the process from one to another, but also omission and addition of a step).

As explained above, conventional semiconductor processing process control systems could not quickly cope with changes in process, calculation method of control variables, processing apparatus, and so on, and as a result, there was the possibility of delaying development of semiconductor devices.

SUMMARY OF THE INVENTION

It is therefore an object of the invention to provide a semiconductor processing process control system which can flexibly, quickly cope with changes in process, calculation method of control variables and processing apparatus.

In order to accomplish the aforementioned and other objects, according to one aspect of the present invention, a semiconductor processing process control system comprises:

a process controller main body having a function of controlling part of controls of processes for semiconductor processing, which is independent from semiconductor processing devices and processing targets; and a plurality of control variable computing sections provided for respective the semiconductor processing devices and the processing targets, and detachably inserted into to the process controller main body to obtain control variables of semiconductor processing devices which meet the semiconductor processing devices and the processing targets, the process controller main body controlling processes of semiconductor processing on the basis of the control variables obtained by the control variable computing section inserted therein.

According to another aspect of the present invention, a semiconductor processing process control system comprises:

a process controller main body having a function of controlling part of controls of processes for semiconductor processing, which is independent from semiconductor processing devices and processing targets;

a plurality of control variable computing sections provided for respective the semiconductor processing devices and the processing targets to obtain control variables of semiconductor processing devices which meet the semiconductor processing devices and the processing targets; and a control variable computation method section detachably inserted into the process controller main body to manage the control variable computing sections according to a computing method over a plurality of predetermined processes, the control variable computing sections detachably inserted into the control variable computation method section, the process controller main body controlling processes of semiconductor processing on the basis of the control variables obtained by the control variable computation method section inserted into the process controller main body and the control variable computing section inserted into the control variable computation method section.

According to a further aspect of the present invention, a semiconductor processing process control system for controlling a plurality of processes for semiconductor processing, comprises:

a skip judgment request receiving section which receives a request for judgment whether a process can be skipped or not;

a plurality of judgment plug-in each having a step skip judgment logic for judging whether a certain process can be skipped or not;

a skip judgment yes/no section for searching out a judgment plug-in corresponding to a process to be judged, which is received by the skip judgment request receiving section, from the plurality of judgment plug-in;

a judgment execute section which activates the judgment plug-in searched out by the skip judgment yes/no section and makes the judgment plug-in judge whether the one process can be skipped or not, on the basis of the step skip judgment logic;

a judgment result receiving section which receives from the activated judgment plug-in a result of judgment whether the one process can be skipped or not; and a skip execute section which effects skipping of the one process when the result of judgment indicates that the process can be skipped.

According to one aspect of the invention, a method for controlling a semiconductor processing process control system which includes a process controller main body having the function of controlling part of controls of processes for semiconductor processing, which is independent from semiconductor processing devices and processing targets, comprises the steps of:

selecting one of a plurality of control variable computing sections which are provided for respective the semiconductor processing devices and the processing targets and can be detachably inserted into the process controller main body, and inserting the control variable computing section, which is selected, into the process controller main body;

operating the control variable computing section inserted into the process controller main body to obtain a control variable of a semiconductor processing device, which is agreeable with the semiconductor processing devices and the processing targets; and operating the process controller main body to control a process for semiconductor processing on the basis of the control variable obtained.

According to another aspect of the invention, a method for controlling a semiconductor processing process control system which includes a process controller main body having the function of controlling part of controls of processes for semiconductor processing, which is independent from semiconductor processing devices and processing targets, comprises the steps of:

selecting at least one of a plurality of control variable computing sections, which are provided for respective the semiconductor processing devices and the processing targets;

selecting one of a plurality control variable computation method sections which manage the control variable computing sections over a plurality of processes, the control variable computation method sections being configured to be detachably inserted into the process controller main body when necessary, and the control variable computing sections being configured to be detachably inserted into the control variable computation method sections;

inserting the control variable computing sections selected into the control variable computation method section selected, and inserting the control variable computation method section into the process controller main body;

operating the control variable computation method section inserted into the process controller main body and the control variable computing section inserted into the control variable computation method section to obtain a control variable of a semiconductor processing device which is agreeable with the semiconductor processing devices and the processing targets; and operating the process controller main body to control processes for semiconductor processing on the basis of the control variable obtained.

According to a further aspect of the invention, a method for controlling a semiconductor processing process control system configured to control a plurality of processes for semiconductor processing, comprises:

a skip judgment request receiving step for receiving a request for judgment whether a process can be skipped or not;

a search step for searching out a judgment plug-in corresponding to a process to be judged, which is received by the skip judgment request received in the skip judgment request receiving step from a plurality of judgment plug-in, each the judgment plug-in having a step skip judgment logic for judging whether a certain process can be skipped or not;

a judgment execute step for activating the judgment plug-in searched out to judge whether the one process can be skipped or not;

a judgment result receiving step for receiving from the activated judgment plug-in a result of judgment whether the one process can be skipped or not; and a skip execute step which effects skipping of the one step when the result of judgment indicates that the process can be skipped.

BRIEF DESCRIPTION OF THE DRAWINGS

FIG. 4 is a diagram showing a hardware configuration according to the first embodiment of the invention;

FIG. 18 is a diagram showing an example of computer program according to the fourth embodiment of the invention;

FIG. 22 is a diagram showing operations of a skip judgment request receiver in the fifth embodiment of the invention;

FIG. 23 is a diagram showing operations of a target process skip judgment Yes/No section in the fifth embodiment of the invention;

FIG. 24 is a diagram showing a judgment logic of judgment plug-in in the fifth embodiment of the invention;

FIG. 31 is a diagram showing a conventional processing time computation method used for stacking a plurality of films;

DETAILED DESCRIPTION OF THE PREFERRED EMBODIMENTS (First Embodiment)

The first embodiment of the invention is a semiconductor processing process control system, which is made up of a process controller main body and control variable computation programs and configured to use the control variable computation programs by changing them from one to another depending upon the process. This is explained below in greater detail.

Figure 1A:
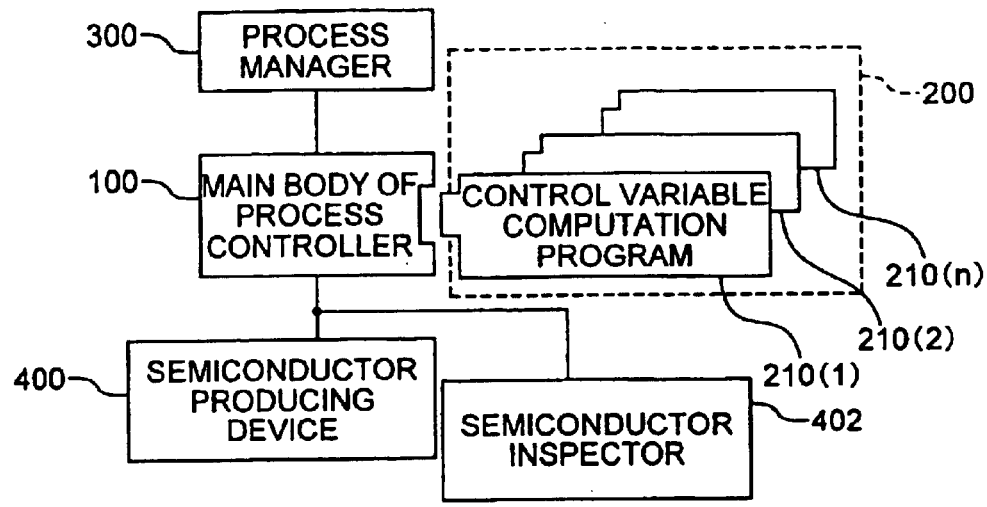
FIG. 1A is a block diagram showing configuration of a semiconductor processing process control system and its peripheral portion according to the first embodiment of the invention.

FIG. 1A is a block diagram showing configuration of this embodiment. Main body 100 of a process controller is coupled to a control variable computing section 200 having a plurality of control variable computation programs 210. Each of the control variable computation programs 210 constitutes the control variable computing section in this embodiment.

The process controller main body 100 is connected to a process manager 300 and one or more semiconductor producing devices 400 and/or semiconductor inspectors 402. The semiconductor producing devices 400 and the semiconductor inspectors 402 constitute the semiconductor processing apparatus in this embodiment.

The process manager 300 is a super system computer which supervises the entire process flow, and it sends process flow information to the process controller main body 100. This process flow information is also called context information, and indicates the order of processes to be executed by the semiconductor producing devices 400 and the semiconductor inspectors 402 and contents of target processing in respective processes.

The process controller main body 100 is a section independent from the semiconductor producing devices 400, semiconductor inspectors 402 and recipes. That is, the process controller main body 100 has the function of executing a part not depending upon the semiconductor processing apparatus and the processing target among controls of processes of semiconductor processing. Control variable computation programs 210(1) through 210(n) form a computing section for computing control variables of the processing apparatus. A feature of this embodiment lies in that any of the control variable computation programs 210(1) through 210(n) prepared for respective recipes can be select and plugged into the process controller main body 100. That is, the control variable computation programs 210(1) through 210(n) are configured to be loaded in and unloaded from the process controller main body 100. A recipe herein means is processing conditions for conducting a certain processing of a certain product in a certain apparatus. Even when a common recipe is used, if the product is different and the recipe is used in a different position and order in a process, the control variable computation program 210 may vary.

Figure 1B:
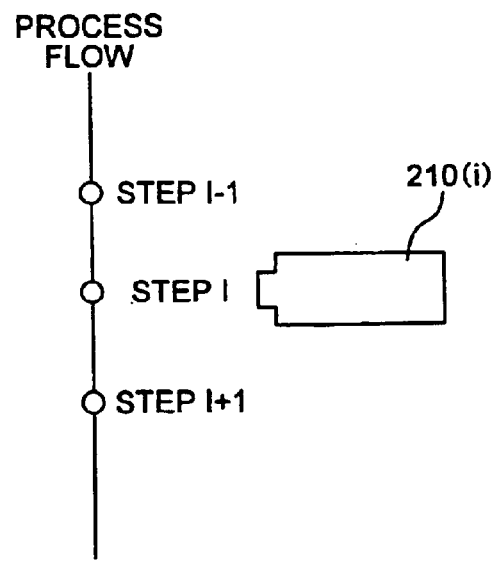
FIG. 1B is a diagram showing a process flow and a control variable computation program in the first embodiment of the invention.
Figures 2, 3:
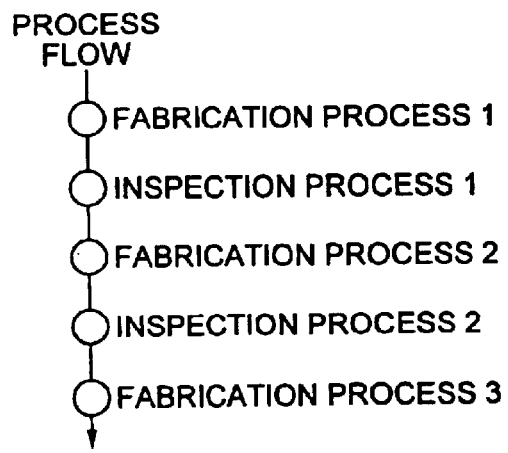
FIG. 2 is a diagram showing a program module according to the first embodiment of the invention.
FIG. 3 is a diagram showing a process flow of semiconductor processing.

FIG. 1B is a diagram showing the process flow and the control variable computation program 210 in the first embodiment of the invention. The control variable computation program 210(i) is applied to a process i. Function of the control variable computation program 210 can be described in form a of a program. Its specific example is shown in FIG. 2. Since the entire process flow of semiconductor processing also includes an inspection process in addition to the processing (manufacturing) process as shown in FIG. 3, let a "processing" used here involve inspection as well, and if a certain process is an inspection process, let the control variable computation program 210(i) be used by appropriately replacing one with another also in the inspection process.

FIG. 4 is a diagram showing a hardware configuration of the semiconductor processing process control system according to the first embodiment of the invention. As shown in FIG. 4, the semiconductor processing process control system includes a process control main server 510, process control sub-server 512, QC (quality control) data server 520 and process managing server 530 and device control servers 540(1) through 540(n) which are connected via a network.

Connected to the process control server 510, QC data server 520 and process managing server 530 are auxiliary storage devices, 515 and 516, which establish database therein. In this case, the process controller main body 100 and the control variable computation program 210 of FIG. 1 correspond to the process control main server 510, and the process manager 300 corresponds to the process managing server 530. Controllers of the semiconductor producing device 400 and the semiconductor inspector 402 are connected to the device control server 540.

Figure 5A:
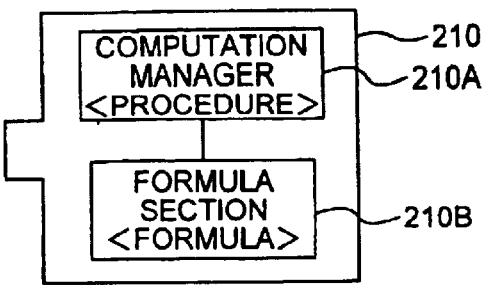
FIG. 5A is a block diagram of the first example of control variable computation program according to the first embodiment.
Figure 5B:
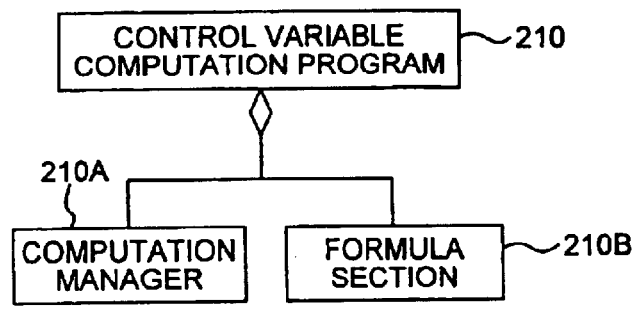
FIG. 5B is a diagram showing the concept of the first example of control variable computation program according to the first embodiment.

As shown in FIGS. 5A and 5B, the control variable computation program 210 is divided into a computation manager 210A for managing the flow of procedures and processing of computing control variables and a formula section 210B composed of computation formulas used for computation of control variables. Since the computation manager 210A varies with device and recipe, it exists for each device and each recipe. The formula section 210B is capable of description inside the control variable computation program 210 in this manner, but it can also introduce and use a formula of an external application (linkage to an external program).

Figure 6:
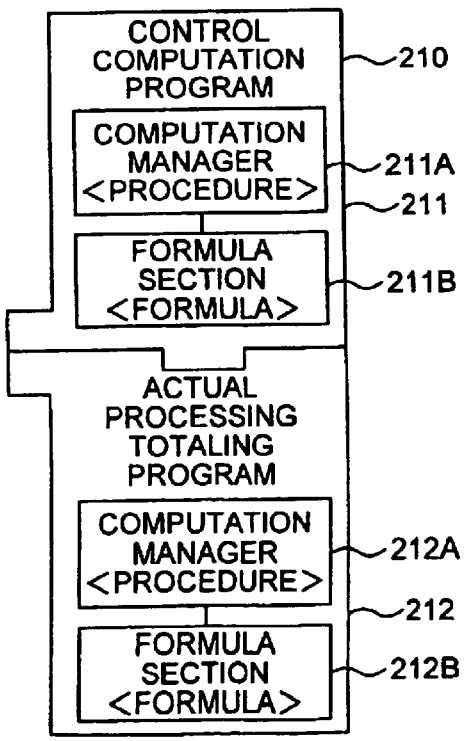
FIG. 6 is a block diagram showing the second example of control variable computation program according to the first embodiment.

On the other hand, as shown in FIG. 6, the control variable computation program 210 can be separated into a control calculation program 211 exclusive to calculation of pure control variables of the processing devices, and an actual processing totaling program 212 exclusive to treatment of processing status data of processing devices, temporary storage and calculation of device constants of processing devices based on these data. Even in this case, the control computation program 211 and the actual processing totaling program 212 can be divided into computation managers 211A, 212A and formula sections 211B, 212B.

Figure 7:
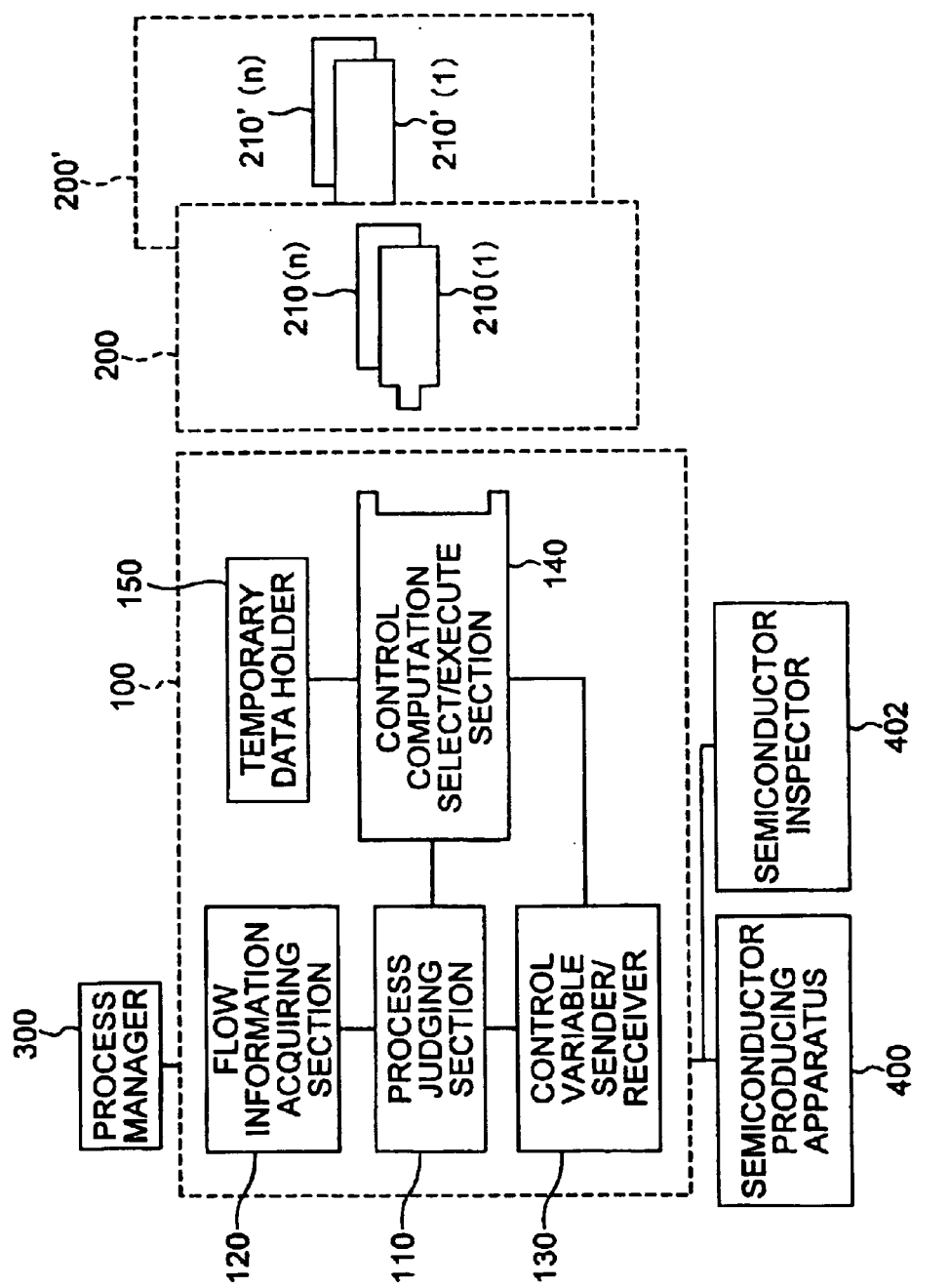
FIG. 7 is a block diagram showing details of a process controller main body according to the invention.

Next shown in FIG. 7 are details of the process controller main body 100. As shown in FIG. 7, the process controller main body 100 includes a process judging section 110, flow information acquiring section 120, control variable sender/receiver 130, control computation select/execute section 140, and temporary data holder 150.

The process judging section 110 is coupled to the flow information acquiring section 120, control variable sender/receiver 130 and control computation select/execute section 140. The control computation select section 140 is further coupled to the control variable sender/receiver 130 and the temporary data holder 150. Thus, the entirety constructs the process controller main body 100. The control computation select/execute section 140 can select and plug in desired one of control variable computation programs 210(1) through 210(n).

Figure 8:
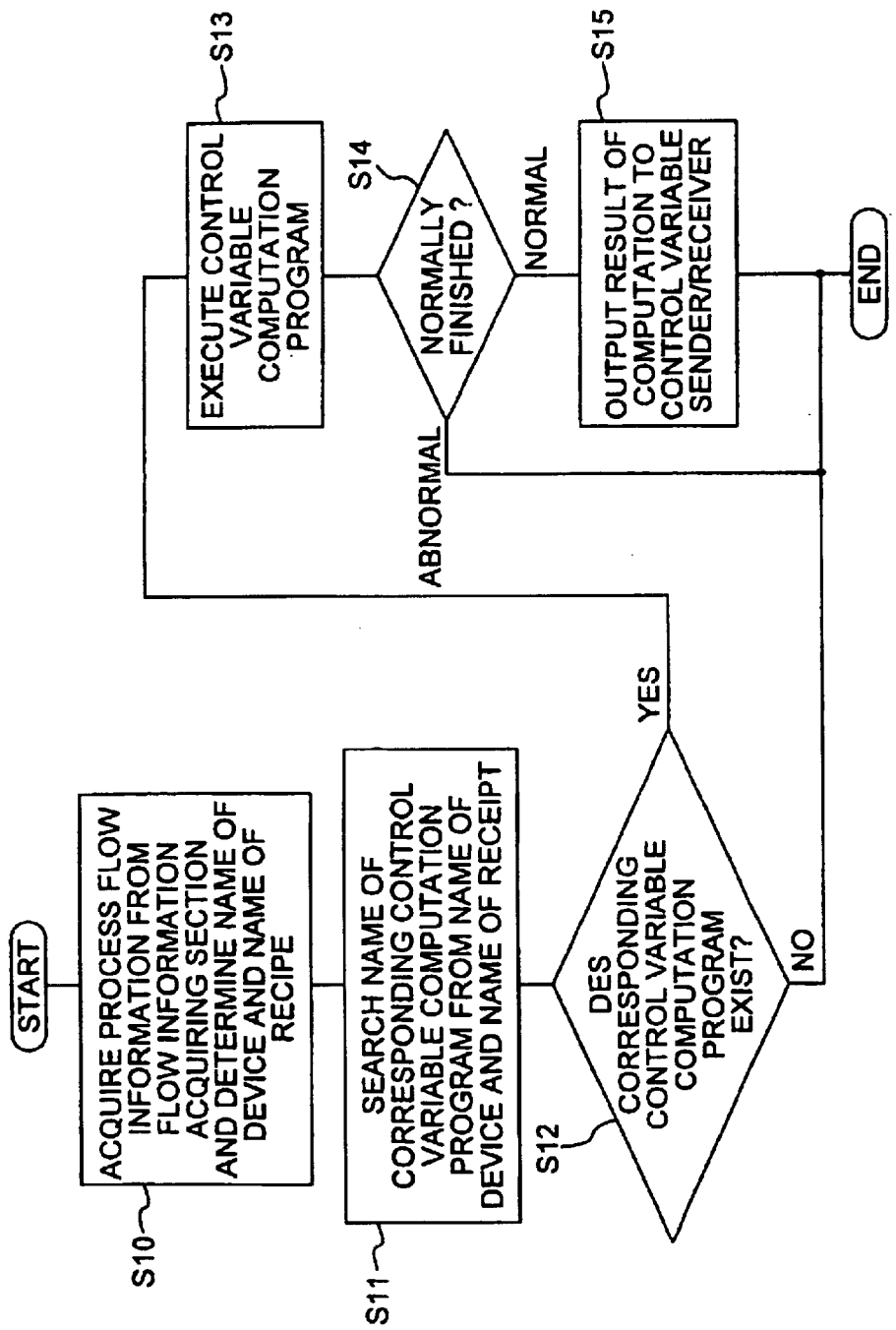
FIG. 8 is a diagram showing a flow of processing in the process controller main body according to the invention.

Selection of control variable computation programs 210(1) through 210(n) is conducted by the process controller main body 100. A flow chart of this processing is shown in FIG. 8.

Registered in the process flow information are target devices to be used for processing or information for determining such target devices and recipes to be used by target devices or information for determining such recipes. Therefore, as shown in FIG. 8, the process judging section 110 acquires this process information from the flow information acquiring section 120 and obtains the name of a target device and the name of a recipe (step 10). Subsequently, in the control computation select/execute section 140, by using a device recipe managing table, which manages devices and recipes, a control variable computation program 210 corresponding to the acquired names of the device and the recipe is searched (step S11). That is, the device recipe managing table manages relations between combinations of names of groups of devices, names of devices and names of recipes and corresponding control computation programs.

Next judged is whether a corresponding control variable computation program 210 exists or not as a result of the search (step S12). When a corresponding control variable computation program 210 exists, this control variable computation program 210 is read out onto a memory, and parameters necessary for the computation are exchanged to execute the control variable computation program (step S13).

When computation by the control variable computation program is finished, judgment is made whether the control variable computation program 210 has been finished normally or not (step S14). If it has been finished normally, the result of the computation is output to the control variable sender/receiver 130, and this processing is finished. Even when no corresponding control variable computation program 210 corresponding exists in step S12, or the control variable computation program 210 was not finished property in step S14, this processing is finished.

Figure 9:
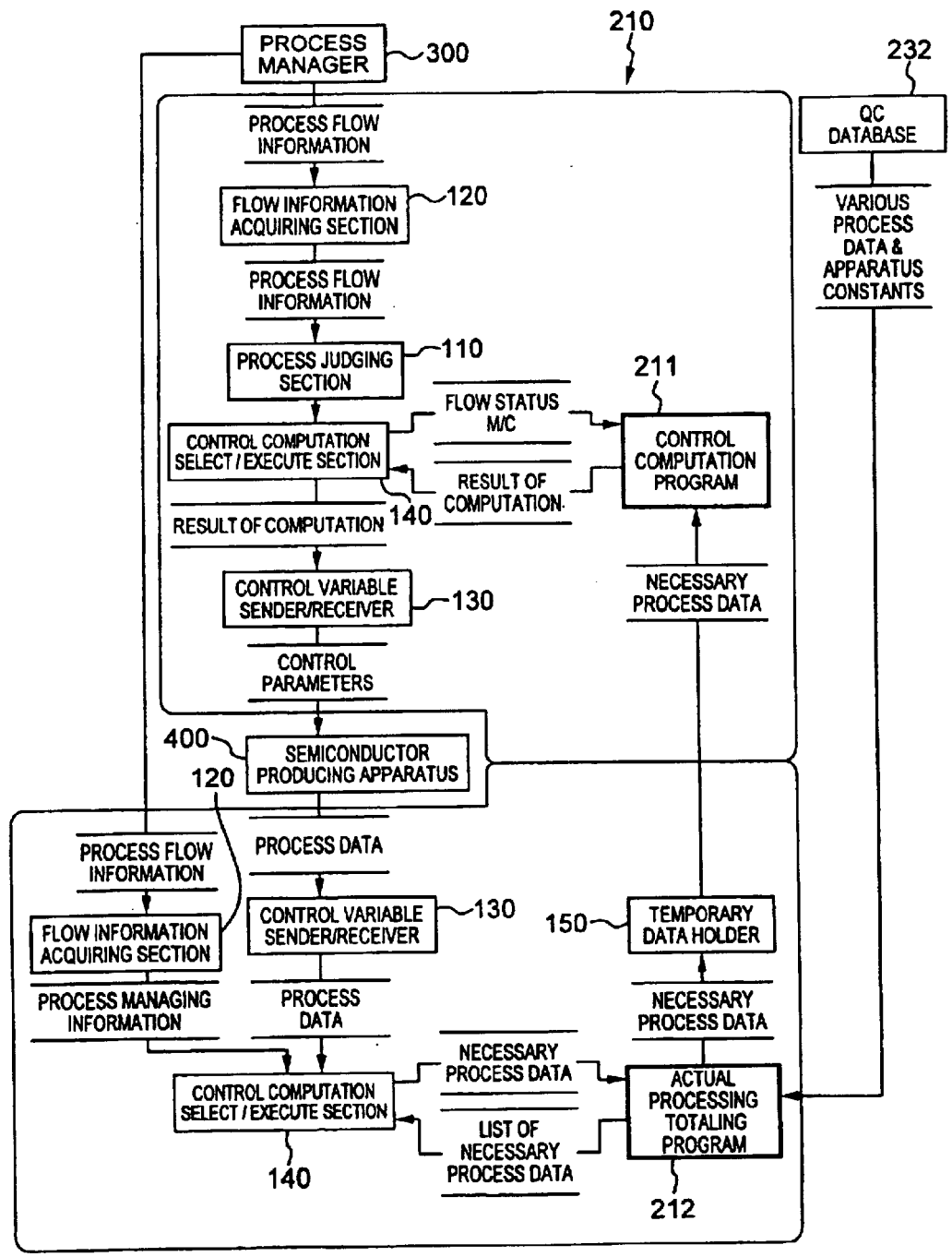
FIG. 9 is a diagram showing a flow of data during practical use of the invention.

Next referring to the data flow diagram of FIG. 9 describing details of the above-explained flow, contents of the processing by the semiconductor processing process control system is explained in greater detail. In FIG. 9, the control variable computation program 210 is divided into the control computation program 211 and the actual processing totaling program 212 as shown in FIG. 6.

First, process flow information is sent from the process manager 300 to the flow information acquiring section 120 of the process controller main body 100. The flow information acquiring section 120 sends this process flow information to the process judging section 110. Based on this process flow information, the process judging section 110 judges the processing status, process, device, and so on. Information obtained by the judgment (status of the processing, such as the start of the processing, apparatus, and so forth) is delivered to the control computation select/execute section 140.

Based on the process information and information about the apparatus, status of the processing, etc., the control computation select/execute section 140 selects and starts a control computation program 211. The started control computation program 211 refers to data in the temporary data holder 150 and various data in the QC database 232, and executes computation. The computation result obtained by the control computation program 211 is sent to the control computation select/execute section 140. Then, after being replaced into control parameters agreeable to respective devices by the control variable sender/receiver 130, it is sent to the semiconductor producing device 400 (or semiconductor inspector 402).

In the above processing, if the process judging section 110 judges that the status of the processing is completion of the processing or inspection, the control computation select/execute section 140 starts the actual processing totaling program 212 for totaling actual processing. It is previously described in this actual processing totaling program 212 that a certain kind of processing data (for example, thickness of a film, actual processing data) from the device, for example.

In this manner, the control variable sender/receiver 130 receives processing data from the semiconductor producing device 400 (or semiconductor inspector 402). This processing data is sent to the control computation select/execute section 140. Further, if necessary, the flow information acquiring section 120 acquires process flow information from the process manager 300. This process flow information contains process managing information. Therefore, the flow information acquiring section 120 extracts the process managing information from the process flow information, and sends it to the control computation select/execute section 140.

The control computation select/execute section 140 delivers to the actual processing totaling program 212 necessary information among the processing data and the process managing information. The actual processing totaling program 212 acquires respective processing data and apparatus constants from the QC database 232, if necessary. Then, based on the received information, the actual processing totaling program 212 totals necessary data processing and its results, and stores them in the temporary data holder 150. The processing data stored in the temporary data holder 150 is adequately used in the control computation program 211 as explained above.

Figure 10:
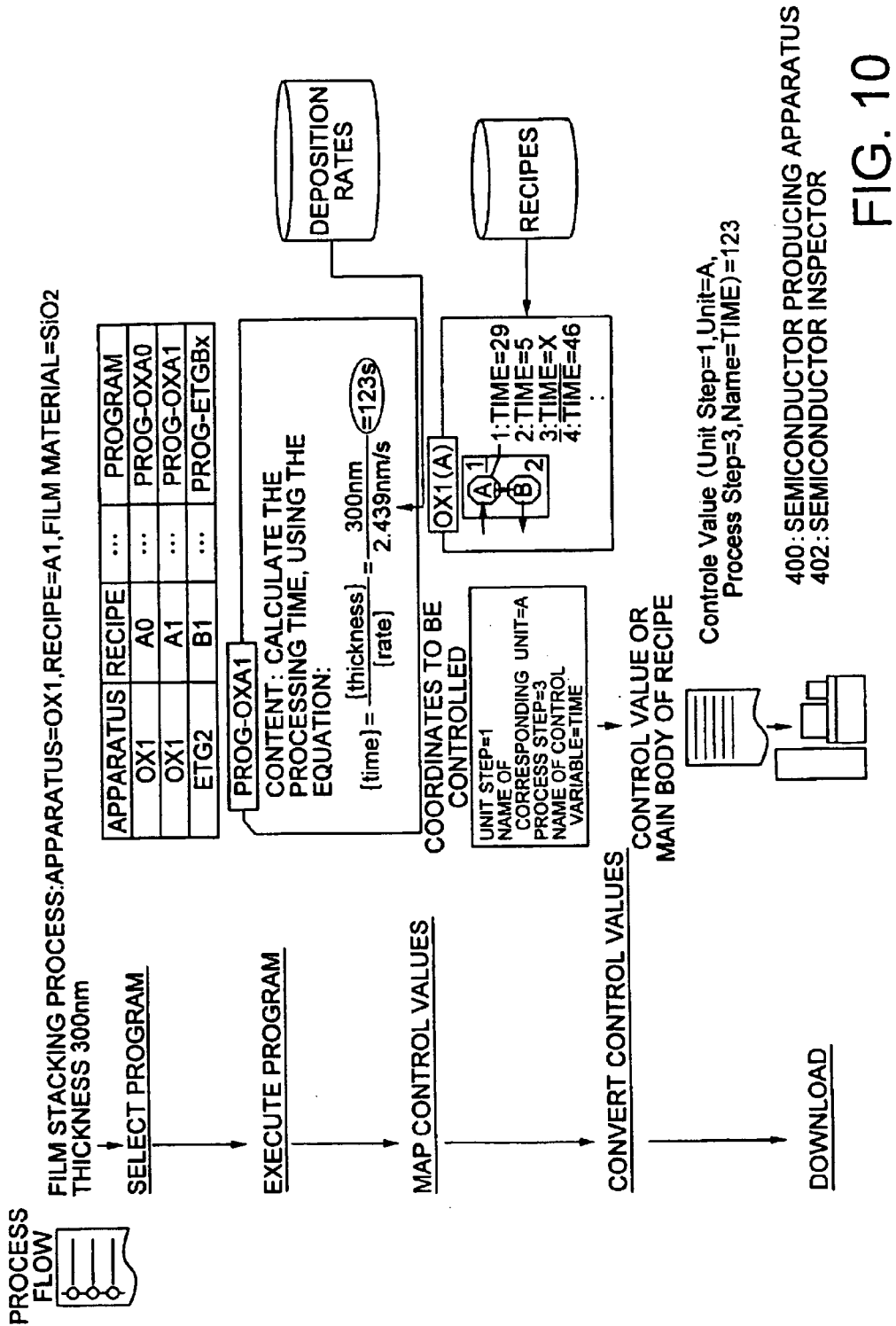
FIG. 10 is a diagram showing a process flow upon computing processing time in a film deposition process using the invention.

Next referring to FIG. 10, a flow of processing by the present embodiment is explained by way of a specific example. FIG. 10 is a diagram showing a process flow upon computing processing time in a film deposition process. Based on the process information acquired from the process flow information, the control computation select/execute section 140 selects one of control variable computation programs 210. Contents of the processing in the control variable computation program 210, in this case, are: (1) reading the target film thickness from the process flow information; (2) determining control variables from the apparatus (name of the apparatus) and content of the processing (name of the recipe); (3) computing the deposition time using a formula; and so forth. Computation results obtained are downloaded to the controller of the semiconductor producing device 400 or the semiconductor inspector 402 via the control variable sender/receiver 130.

As explained above, since the semiconductor processing process control system of this embodiment is divided to the process controller main body 100 which controls the process for semiconductor processing independently from the semiconductor producing device 400 and the semiconductor inspector 402, semiconductor producing device 400 and/or semiconductor inspector 402, and control variable computation program 210 for obtaining control variables meeting with the target processing to be executed thereby, and uses a required control variable computation program 210 by plugging it to the process controller main body 100, the system can readily cope with changes even upon changes in semiconductor producing device 400 and/or semiconductor inspector 402 and intended processing.

For example, even when the target of processing by a single semiconductor producing device 400, it is sufficient to modify only a control variable computation program 210 corresponding to the semiconductor producing device 400, without influences to the other semiconductor producing devices 400 and semiconductor inspectors 402. Therefore, the system can be changed without interrupting operations of the other semiconductor producing devices 4 and semiconductor inspectors 402.

(Second Embodiment)

The second embodiment of the invention constructs the control variable computing section from a control variable computation method program such that the control variable computation method program appropriately activates a plurality of control variable computation programs connected thereto to enable control of a plurality of steps. This is explained below in greater detail.

Figure 11A:
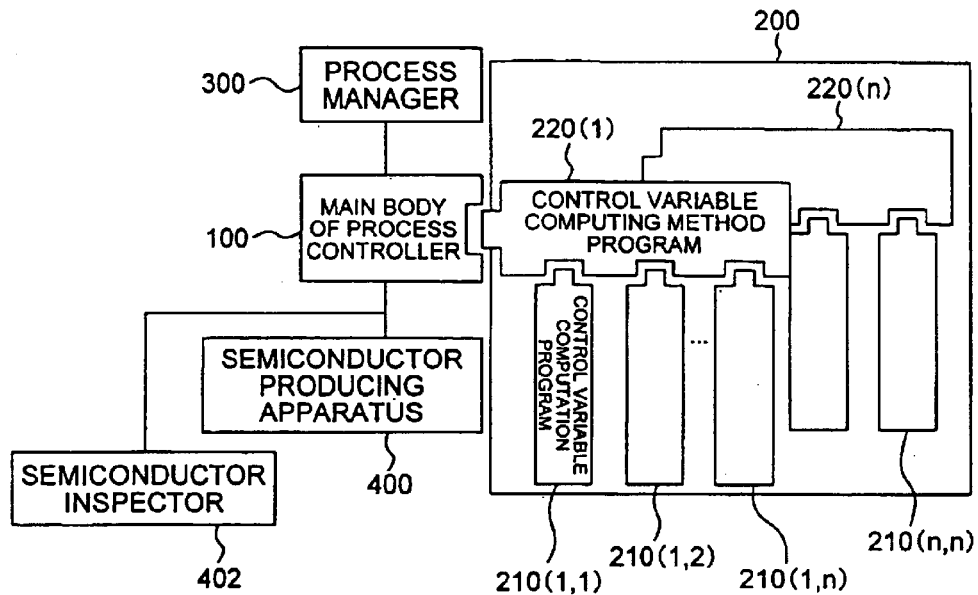
FIG. 11A is a block diagram showing configuration of a semiconductor processing process control system and its peripheral portion according to the second embodiment of the invention.
Figure 11B:
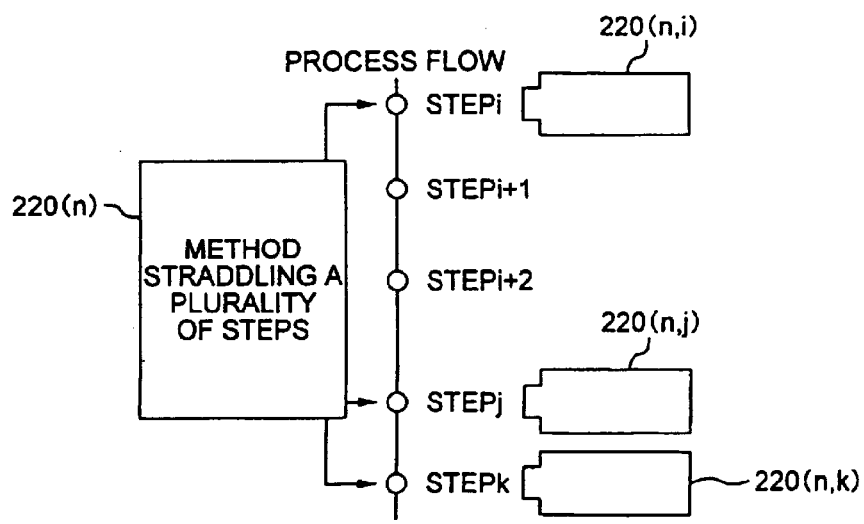
FIG. 11B is a diagram showing a process flow of semiconductor processing in case of a control over a plurality of processes.

FIG. 11A show blocks of components of this embodiment. The control variable computation method program 220 is plugged into the process controller main body 100, and a plurality of control variable computation programs 210 are plugged into the control variable computation method program 220. The control variable computation programs 210 are prepared for respective processes. The control variable computation method program 220 forms a control variable computation method section in this embodiment.

The process controller main body 100 and the control variable computation program 210 have similar functions to those of the first embodiment, but this embodiment is different in that the control variable computation method program 220 is added between them. The control variable computation method program 220 has the function of managing the control variable computation programs 210 in order to perform a process control over a plurality of processes.

An example of operations of this embodiment is shown in FIG. 1B. In this example, control variable computation over three processes of process I, process j and process k is conducted, and the control variable computation method program 220 is in charge of management of information related among these three processes and appropriately activation of the control variable computation programs 210($n$, I), 210($n$, $j$), 210($n$, $k$). In this manner, control variable computation programs 210 corresponding to respective ones of a plurality of processes can be managed collectively by the control variable computation method program 220. The control variable computation method program 220 is characterized in being capable of describing a method of calculation over a plurality of processes in addition to binding and management of a plurality of control variable computation programs 210. Similarly to the first embodiment, the term "processing" is used here to involve inspection as well.

Figure 12A:
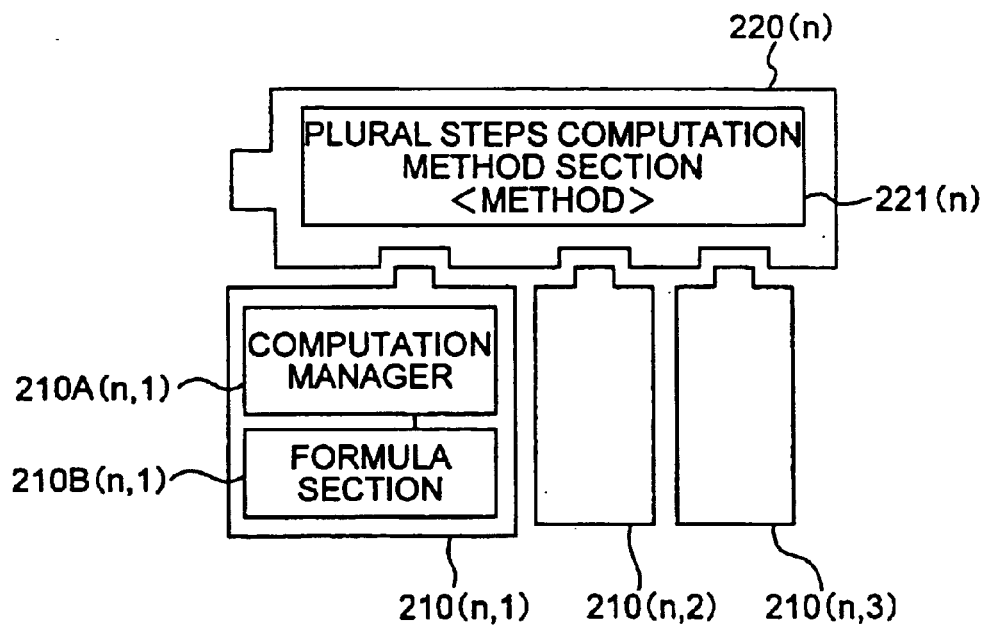
FIG. 12A is a block diagram showing details of the main body of control variables according to the second embodiment of the invention.
Figure 12B:
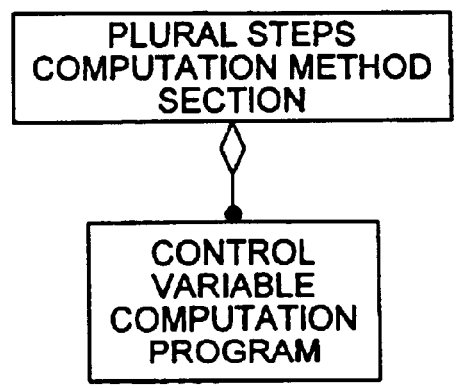
FIG. 12B is a block diagram schematically showing the main body of control variables according to the second embodiment of the invention.

As shown in FIGS. 12A and 12B, each control variable computation programs 210 is divided into a computation manager 210A for managing the flow of procedures and processing of computing control variables and a formula section 210B composed of computation formulas used for computation of control variables similarly to the first embodiment. The control variable computation method program 220 contains a plural steps computation method section 221 describing a method of computation over a plurality of processes. If the computation method is different, another control variable computation method program 220 replacing it can be used.

In this embodiment, configuration other than the control variable computation method program 220 is the same as the first embodiment, and explanation about the other configuration is omitted.

Figure 13:
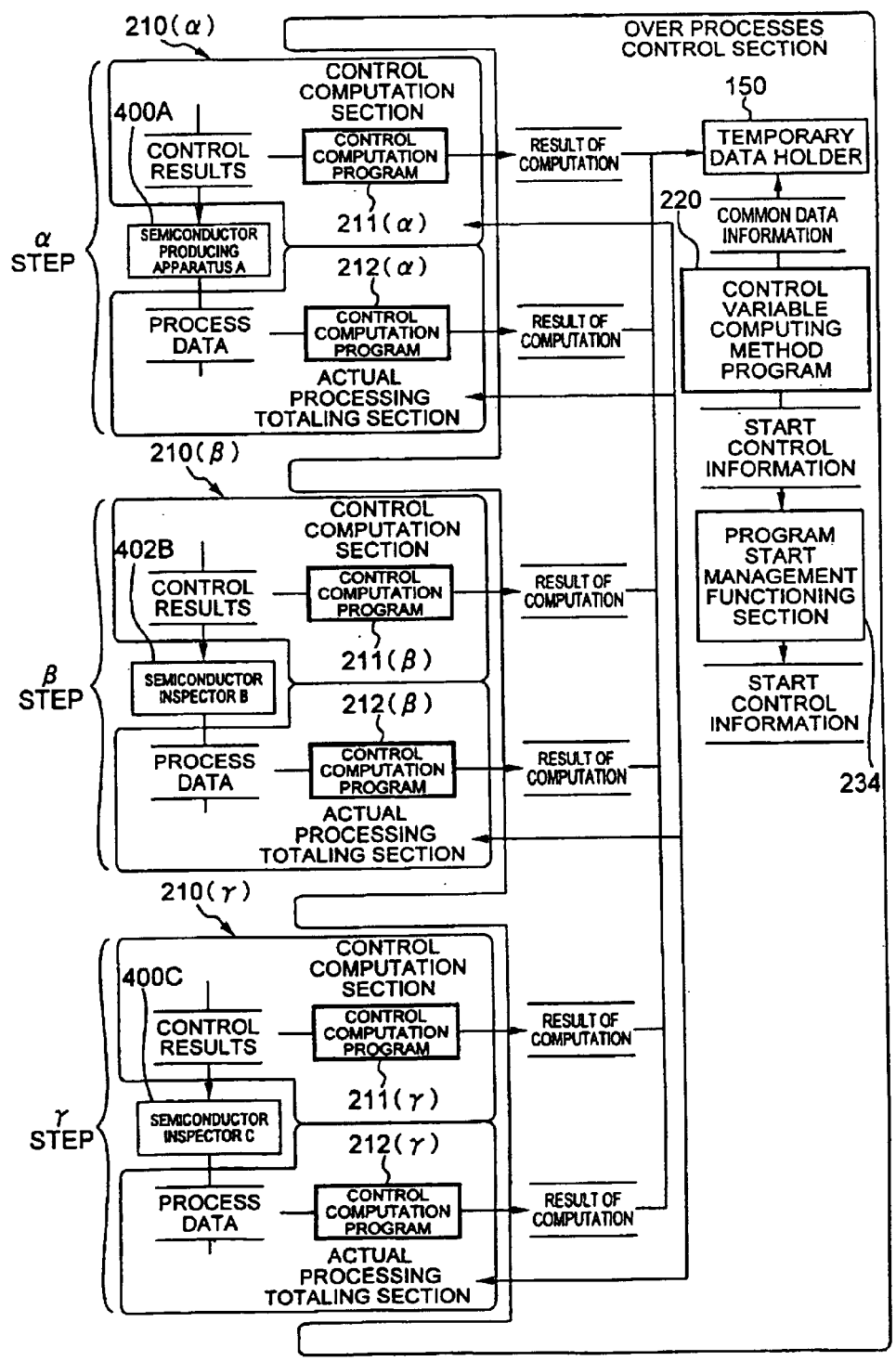
FIG. 13 is a diagram showing a flow of data according to the second embodiment of the invention.

A flow of entire data in this embodiment is shown in FIG. 13. Here again like the first embodiment, each control variable computation program 210 is separated to a control computation program 211 and an actual processing totaling program 212.

A flow of the processing in this embodiment is explained below. Process flow information is acquired by the flow information acquiring section 120 and delivered to the control computation select/execute section 140 through the process judging section 110. Then, based on instructions from the control computation select/execute section 140, the control variable computation method program 220 selects a control variable computation program 210($\alpha$), and activates it appropriately. At that time, the control variable computation method program 220 selects the control variable computation program 210($\alpha$) in accordance with the process flow information acquired from the process flow information.

The control variable computation program 210($\alpha$) executes the same processing as that in the first embodiment explained with reference to FIG. 9 to obtain a result of computation from the control variable computation program 210($\alpha$) and deliver control parameters to the semiconductor producing device 400A. The result of the computation by the control variable computation program 210($\alpha$) is also stored in the temporary data holder 150.

The processing data obtained from the semiconductor producing device 400A is sent to the actual processing totaling program 212($\alpha$). The actual processing totaling program 212($\alpha$) totals the processing data and stores its computation result in the temporary data holder 150.

Subsequently, in the same manner, the control variable computation method program 220 selects the control variable computation program 210 ($\beta$), and activates it appropriately. The processing content in the control variable computation program 210($\beta$) is to acquire data as a result of inspection of the film thickness from the semiconductor inspector 402 and hold it in the temporary data holder 150.

In the next process, the control variable computation method program 220 selects and activates the control variable computation program 210($\gamma$). In this example, the control variable computation program 210($\gamma$) is designed to conduct predetermined computation and obtain the etching time from inspection data of the film thickness held in the temporary data holder 150 and the latest device constant acquired from the AC data base (in this case, the processing speed, especially the etching rate). This computation result is sent as control variables to controllers of the semiconductor producing device 400 and the semiconductor inspector 402 through the control variable sender/receiver 130.

At that time, the control variable computation method program 220 activates the control variable computation program 210($\beta$) and the control variable computation program 210($\gamma$), and makes a relation between their data. More specifically, the control variable computation method program 220 sends common data information to the temporary data holder 150 and manages the temporary data holder 150. Further, the control variable computation method program 220 start control information to the control variable computation program 210($\beta$) and the control variable computation program 210($\gamma$) via a program start managing section 234. The start control information is information for exclusively activating each program.

As explained above, since the semiconductor processing process control system according to this embodiment is so configured that control variable computation method programs 220 can be inserted into and removed from the process controller main body 100 and control variable computation programs 210 can be inserted into and removed from the control variable computation method programs 220, control over a plurality of processes can be conducted easily.

Additionally, like the first embodiment already explained, since the semiconductor processing process control system of this embodiment is divided to the process controller main body 100 which controls the process for semiconductor processing independently from the semiconductor producing device 400 and/or the semiconductor inspector 402, semiconductor producing device 400 and/or semiconductor inspector 402, and control variable computation program 210 and control variable computation method program 220 for obtaining control variables meeting with the target processing to be executed thereby, and uses a required control variable computation program 210 by plugging it to the process controller main body 100 via the control variable computation method program 220, the system can readily cope with changes even upon changes in semiconductor producing device 400, semiconductor inspector 402 and intended processing.

(Third Example)

The third embodiment of the invention is a semiconductor processing process control system including therein a correspondence information data section indicating correspondence between logical step processing and physical step processing, and it is capable of having each physical step processing related to a logical step.

Configuration of this embodiment is the same as, in particular, the second embodiment excepting the use of the correspondence information data section.

Figure 14:
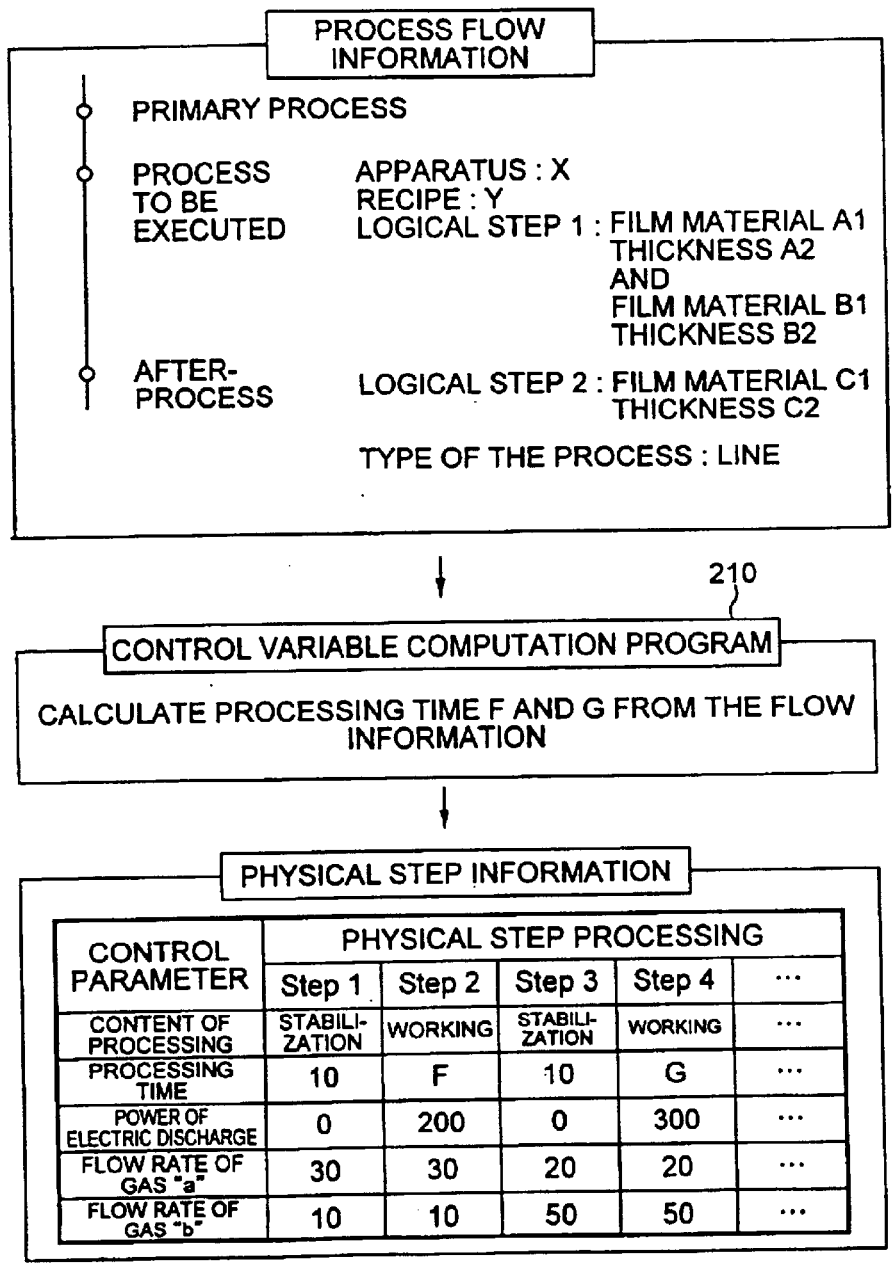
FIG. 14 is a diagram showing an example of process information and physical step information according to the third embodiment of the invention.

Explained below is an example in which etching of a plurality of films is conducted in this embodiment. FIG. 14 shows process flow information and physical step information (information about combinations of control parameters in individual physical steps), and FIG. 15 shows a method of computing processing time.

Figure 15:
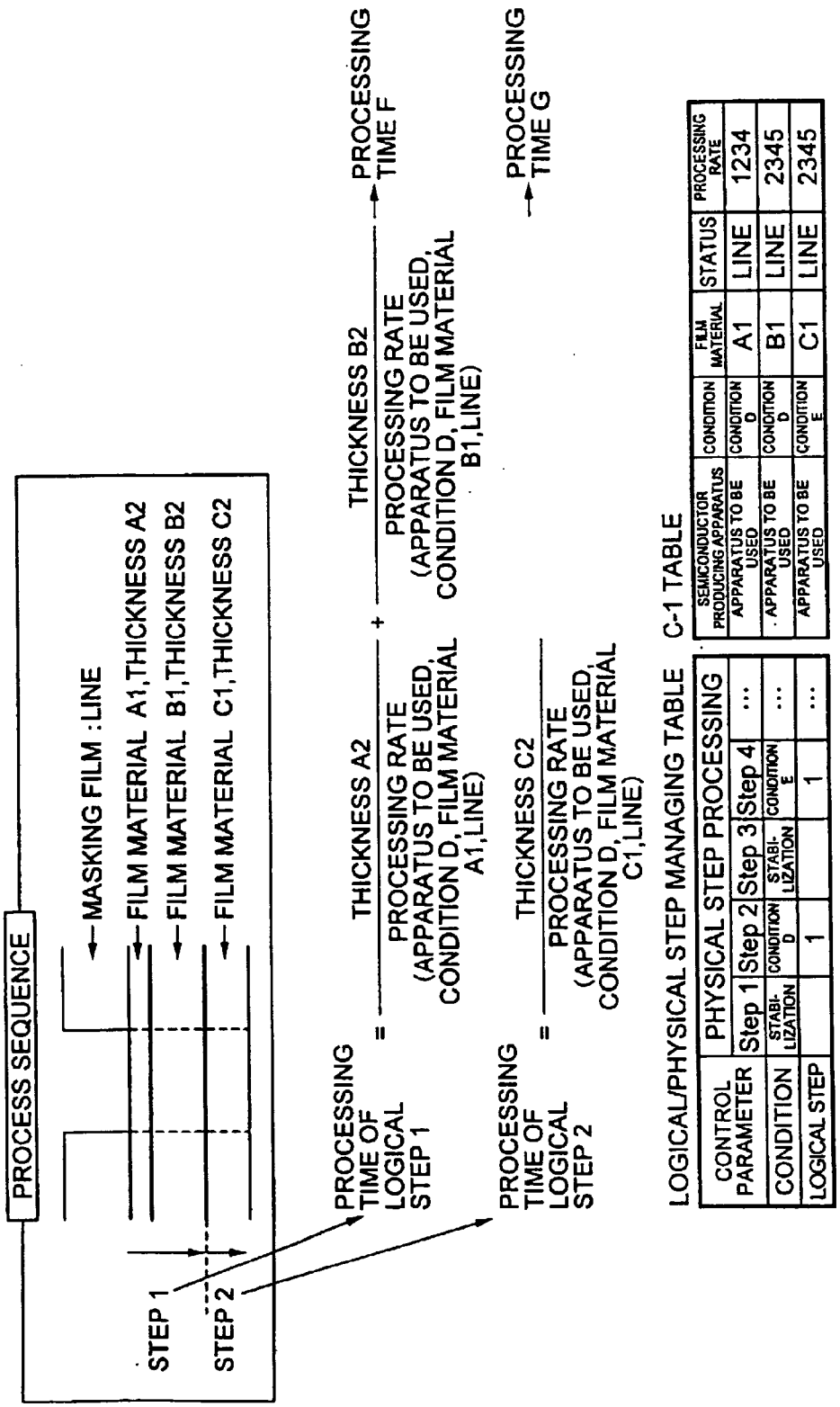
FIG. 15 is a diagram showing an example of computation of processing time according to the third embodiment of the invention.

As shown in FIGS. 14 and 15, the process flow information has a description of processes for simultaneously etching a film A (of a material A1 having a thickness A2) and a film B (of a material B1 having a thickness B2) to be processed under a condition D and for etching a film C (of a material C1 having a thickness C2) under a condition E. That is, a process for sequentially etching films under two different conditions within a single process is described in the process flow information.

These two steps directly connected to respective processing conditions at that time are called logical steps. That is, in this case, simultaneous etching of the film A and the film B is one logical step, and etching of the film C is another logical step. These two logical steps are realized by executing four physical steps adding a step for stabilization of the processing before each etching process.

By referring to the logical/physical step managing table provided in the correspondence information data section, it is known that the first logical step and control condition D correspond to the second physical step whereas the second logical step and control condition E correspond to the fourth physical step. On the basis of these relations, by referring to a root table inside the QC database 232 (see FIG. 9), etching rates are acquired. Then, processing times F, G for the fist logical step and the second logical step are calculated from the target thicknesses of films (depths) and etching rates. This formula is incorporated into the control variable computation program 210 and used for computation. The calculated processing time F is the processing time of the second physical step, and the processing time G is the processing time of the third physical step.

As explained above, according to the semiconductor processing process control system of this embodiment, it is possible to establish correspondence between logical steps shown in the process flow information and physical steps concerning actual operations of semiconductor producing devices 400 and/or semiconductor inspectors 402. Therefore, semiconductor producing devices 400 and semiconductor inspectors 402 can be controlled reliably.

(Fourth Embodiment)

The fourth embodiment of the invention is modified from the second embodiment such that the actual processing computation program judges whether a process may be omitted or not.

Figure 16:
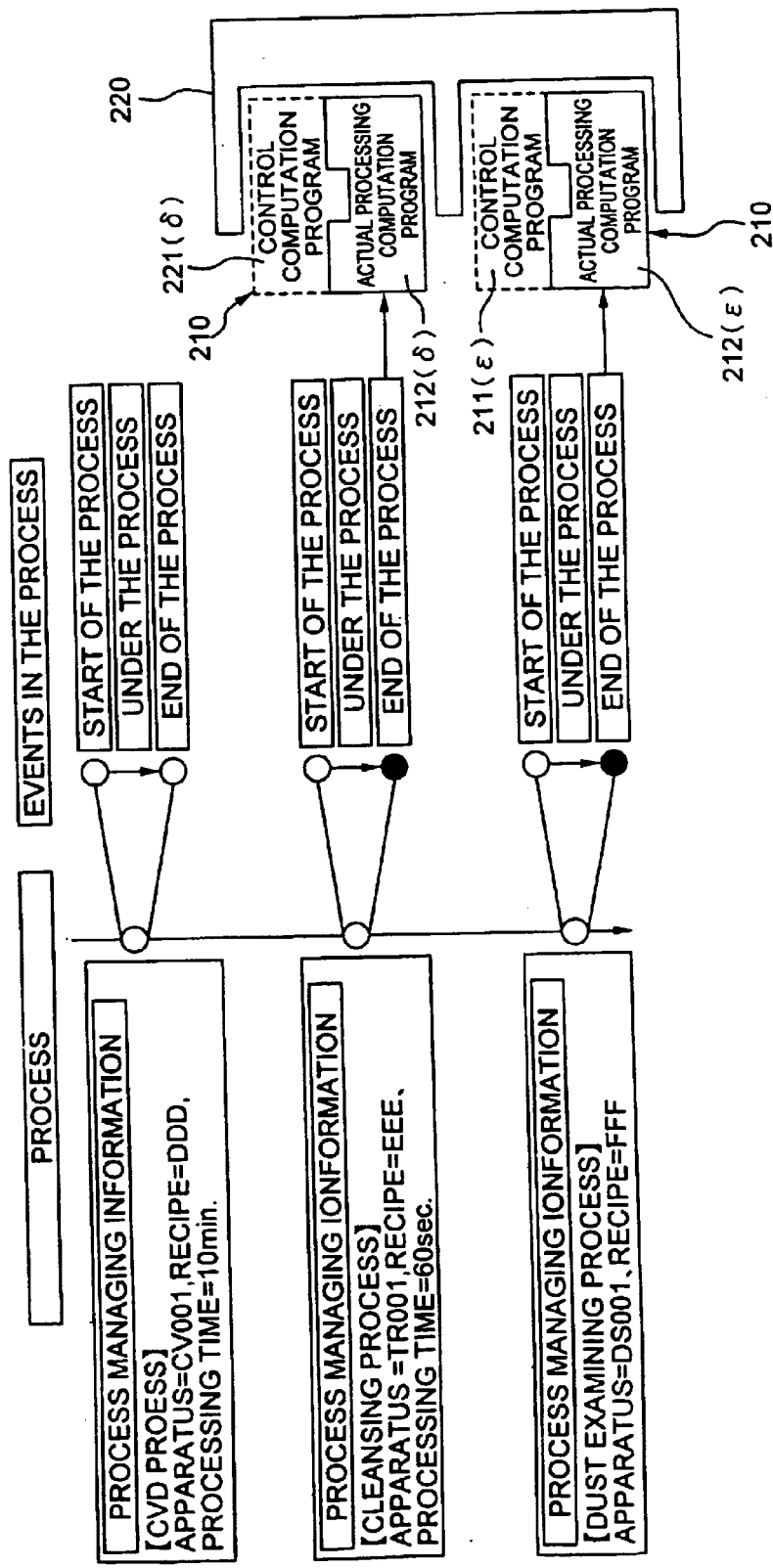
FIG. 16 is a diagram showing a flow of a process according to the fourth embodiment of the invention.
Figure 17:
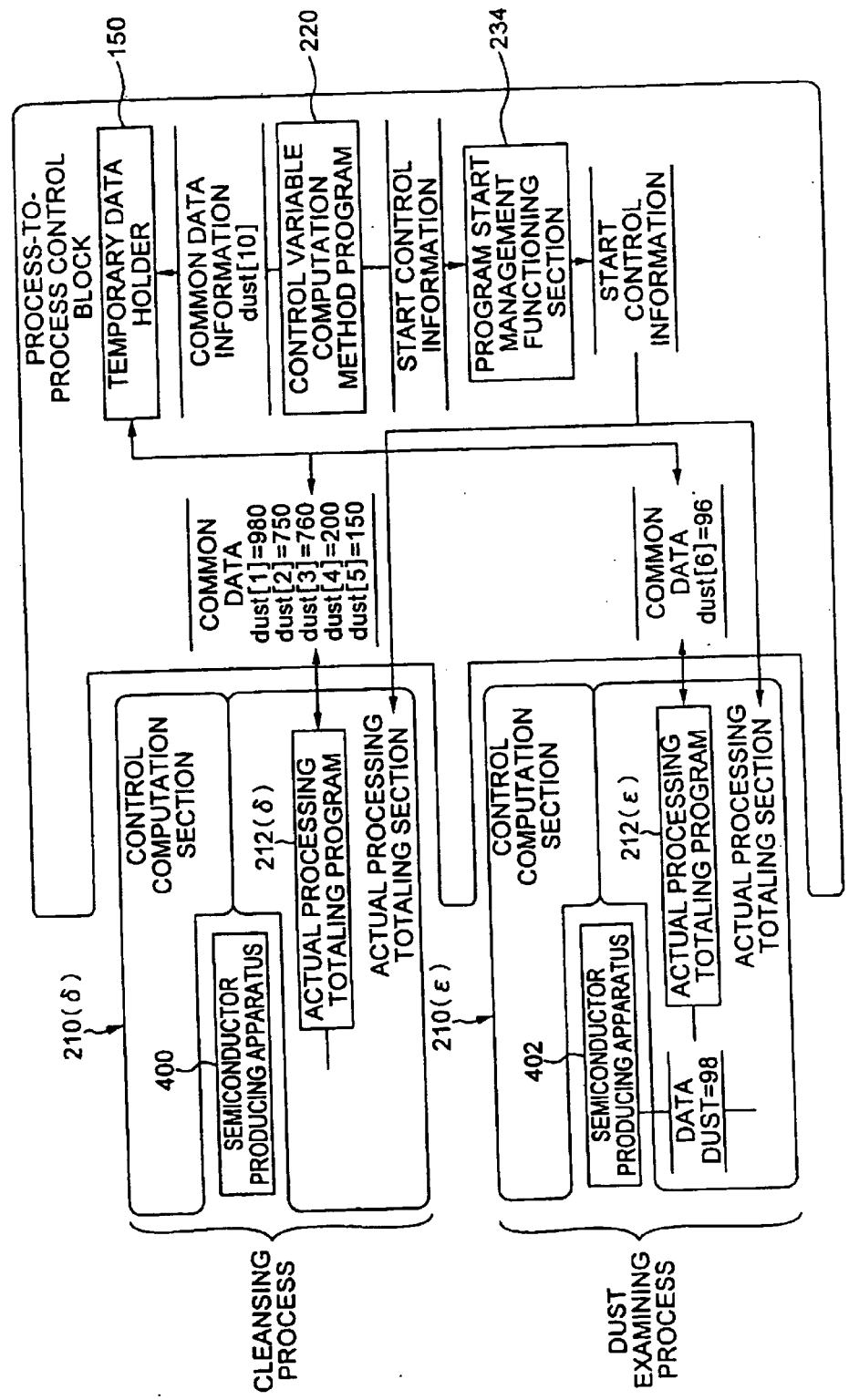
FIG. 17 is a diagram showing a flow of data according to the fourth embodiment of the invention.

A process flow for concretely explaining this embodiment is shown in FIG. 16, a flow of data is shown in FIG. 17, and a computer program used therefore is shown in FIG. 18.

In the example of FIG. 16, let the process includes three processes of a CVD deposition process, cleansing process and dust examining process. Although the cleansing process is used for removing dust generated in the deposition process, assume here that judgment about omission of the cleansing process is conducted when the amount of dust detected in the dust examining process is small. That is, when the totaling result by the actual processing computation program 212($\epsilon$) shows that the amount of dust remains below a predetermined reference value for a predetermined period, the cleansing process is omitted. That is, the cleansing process is skipped.

As shown in FIG. 17, process flow information (names of apparatuses, names of recipes, processing times) of the deposition process, cleansing process and dust examining process are acquired by the flow information acquiring section 120 (see FIG. 7), then sent to the control computation select/execute section 140 (see FIG. 7), and an appropriate control variable computation method program 220 is selected. The control variable computation method program 220 activates the control variable computation program 210($\delta$) of the cleansing process. As a result, cleansing is executed in the semiconductor producing device 400. Data of this processing is totaled by the actual processing totaling program 212($\delta$). This actual processing totaling program 212($\delta$) acquires data on the amount of dust of the preceding lot held in the temporary data holder 150, and it judges omission or execution of the process according to a formula appropriately preset for judgment about omission of the process.

In the next process, the control variable computation method program 220 activates the control variable computation program 210($\epsilon$). As a result, dust inspection is conducted by the semiconductor inspector 402. Data of this processing is totaled by the actual processing totaling program 212($\epsilon$). That is, the actual processing totaling program 212($\epsilon$) acquires data about the mount of dust from the semiconductor inspector 402 which is a dust inspector. Subsequently, the actual processing totaling program 212($\epsilon$) holds the data about the amount of dust in the temporary data holder 150. The data on the amount of dust is used in the next lot for judging whether the cleansing step should be omitted or not.

In this manner, totaling operations of these two actual processing totaling programs 212($\delta$) and 212($\epsilon$) are executed by the control variable computation method program 220. This control variable computation method program 220 is in charge of management of the temporary data holder 150 and delivery of the start instruction to the actual processing totaling programs 212 through a program start management functioning section 234, among others.

As explained above, since the semiconductor processing process control system according to this embodiment is configured to total results of inspection in the inspection process and automatically judge, in response to the result of the inspection, whether the cleansing process precedent to the inspection process can be omitted or not, judgment about omission or execution of a cleansing process heretofore made by human operators can be done automatically by the system. Therefore, it is possible to progress systemization of controls of processes for semiconductor processing and hence reduce the term of works and the manufacturing cost.

(Fifth Embodiment)

The fifth embodiment of the invention is a step skip device in which a step skip judging section for judgment about skipping of a step is provided as an external plug-in which can be easily detached. This embodiment is explained below in detail.

Figure 19:
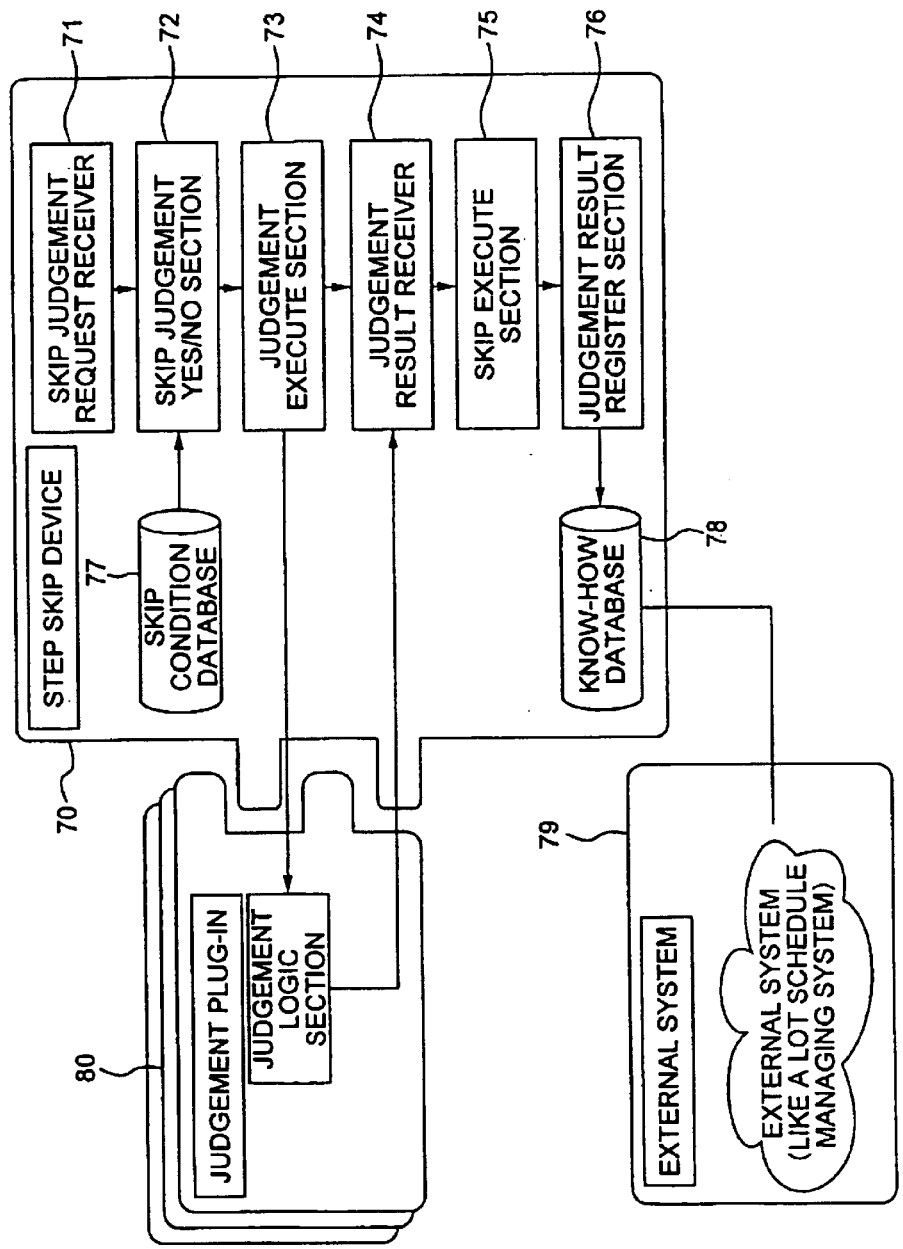
FIG. 19 is a diagram showing a functional block according to the fifth embodiment of the invention.
Figure 20:
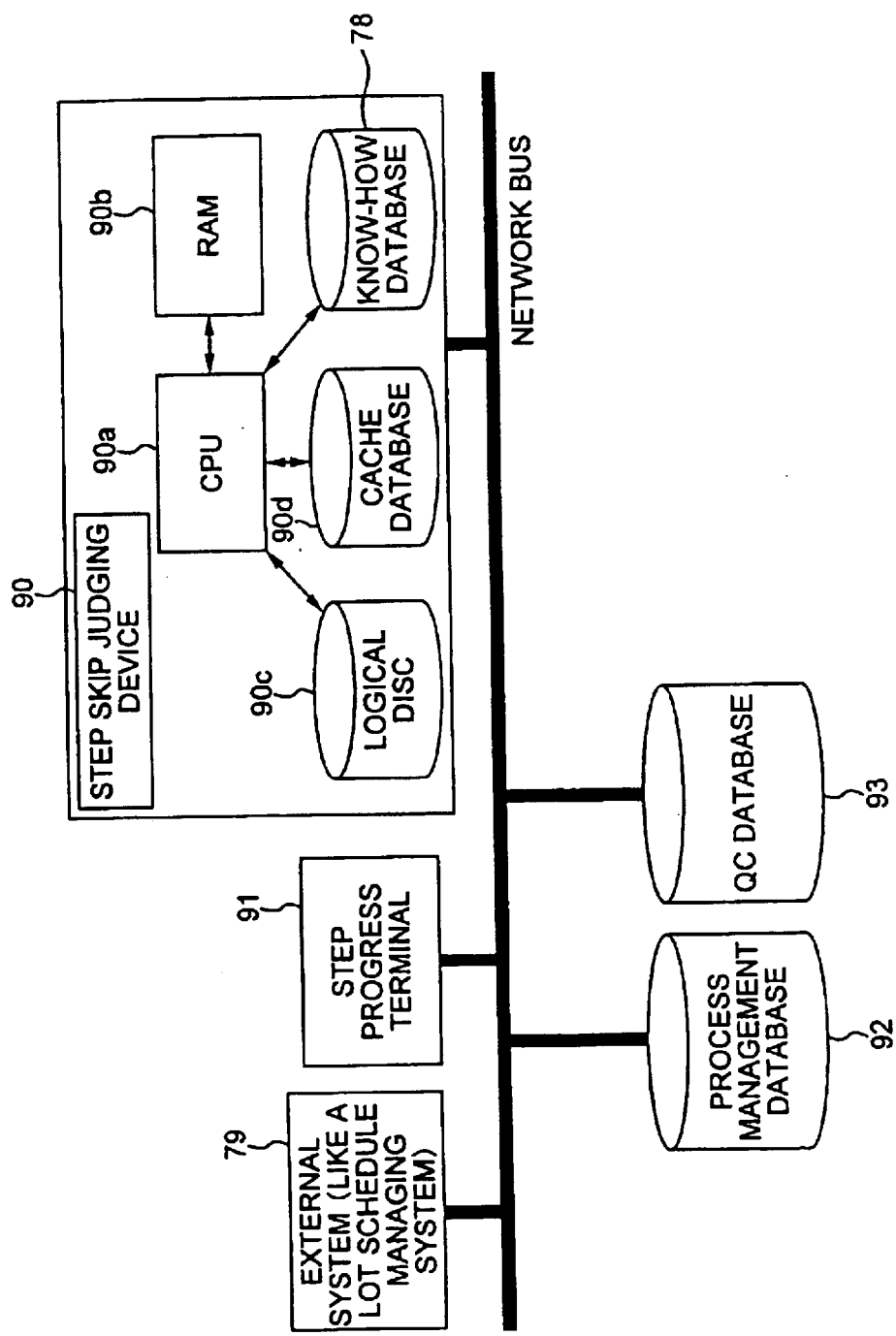
FIG. 20 is a diagram showing hardware configuration according to the fifth embodiment of the invention.

A function block of this embodiment is shown in FIG. 19, and a computer (hardware) for realizing this function is shown in FIG. 20. A step skip device 70 includes a skip judgment request receiver 71, skip judgment Yes/No section 72, judgment execute section 73, judgment result receiver 74, skip execute section 75, judgment result register section 76, skip condition database 77 and know-how database 78. A detachable judgment plug-in 80 is coupled to the step skip device 70. Further, an external system 79 is connected to the step skip device 70 via the know-how database 78.

Operations in this embodiment are explained below in sequence by way of a specific example. The skip judgment request receiver 71 receives a skip judgment request by lot process start information. In response to the request, the skip judgment yes/no section 72 searches into the skip condition database 77 in which types of semiconductor devices to be manufactured, names of judgment plug-in used for skip judgment of a process, among others, are registered, and extracts a judgment plug-in 80 corresponding to the process.

In receipt of the extracted information, the judgment execute section 73 activates the corresponding judgment plug-in 80 to have it execute judgment whether step skip should be done or not. Result of the judgment by the judgment plug-in 80 is received by the judgment result receiver 74, and step skip is executed by the skip execute section 75. The judgment result register section 76 records the history of skip judgment in the know-how database 78 to enable supply of information to the external system 79.

Next referring to FIG. 20, hardware configuration of the step skip device according to the embodiment is explained. The skip step device according to this embodiment includes a step skip judging device 90, step progress terminal 91, process management database 92, QC database 93, and external system 79 which are connected via a network.

The step skip judging device 90 includes CPU 0a, RAM 90b, local disc 90c, cache database 90d and know-how database 78.

CPU 90a executes step skip judging programs and programs of the judgment pug-in 80. In RAM 90b, step skip judging programs and programs of the judging plug-in 80 are stored. In the local disc 90c, OS and various programs are stored. In the cache database 90d, QC results are stored temporarily. The know-how database 78 stores results of judgment whether a process should be skipped or not. The process management database 92 stores process management information. The QC database 93 stores QC data.

As explained above, since the semiconductor processing process control system according to this embodiment is so configured that the judgment plug-in 80 can be inserted into or removed from the step skip device 70, it can readily cope with changes in judgment logic.

(Sixth Embodiment)

The sixth embodiment of the invention is so configured that a detachable judgment plug-in is in charge of acquiring QC (quality control) data and judgment about step skip based on the data.

Figure 21:
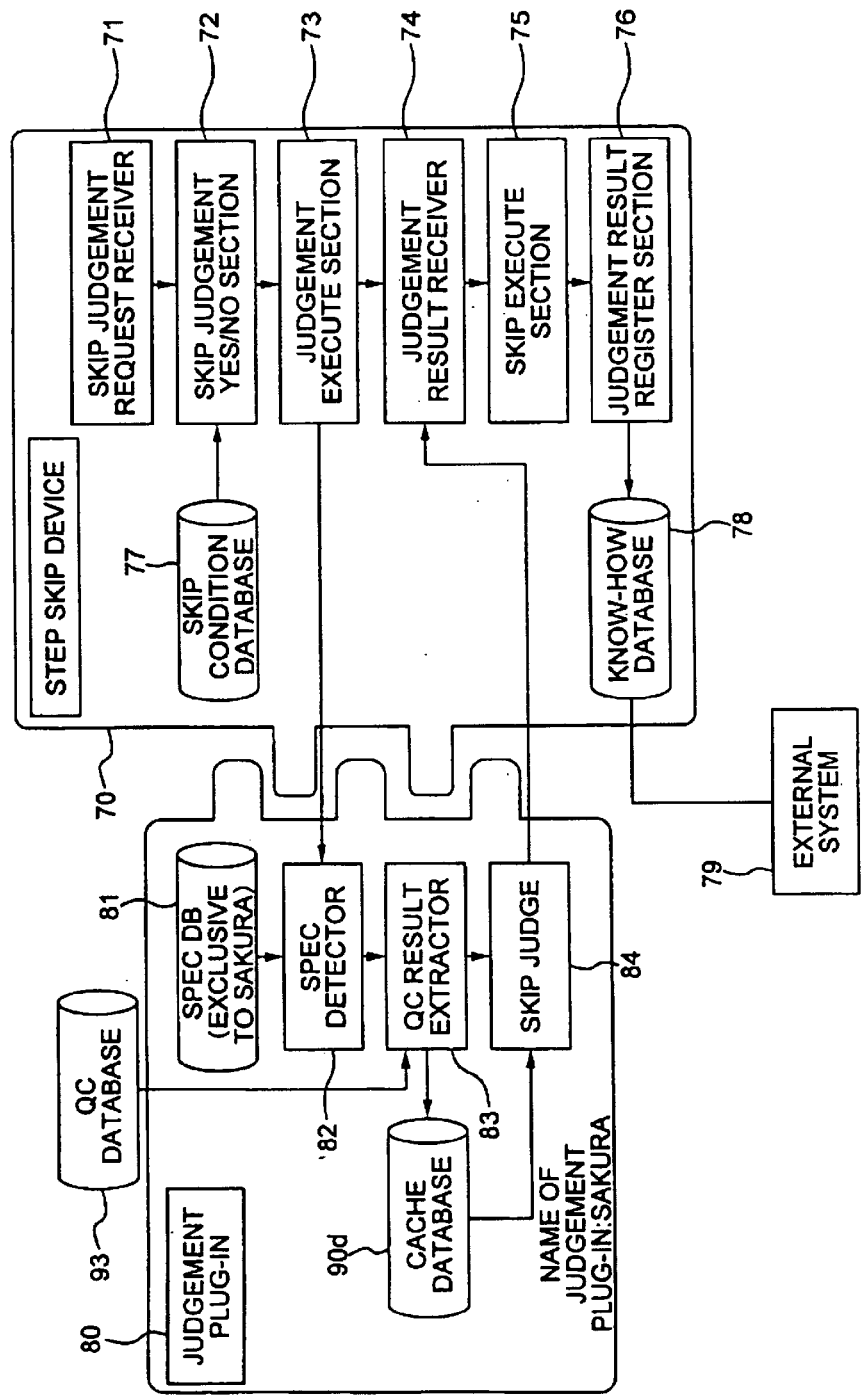
FIG. 21 is a block diagram showing a functional block according to the fifth embodiment of the invention.

FIG. 21 is a diagram showing functional blocks of a step skip device and a judgment plug-in according to the embodiment. As shown in FIG. 21, the judgment plug-in 80 includes a spec database 81, spec detector 82, QC result extractor 83, skip judge 84 and cache database 90d. The QC result extractor 83 is supplied with information from the QC (quality control) database 93.

Next based on FIGS. 22 through 27 and referring to FIG. 21, operations in this embodiment are explained in sequence by way of a specific example. FIGS. 22 through 27 are diagrams showing an example of concrete processing by the embodiment.

As shown in FIG. 22, the skip judgment request receiver 71 receives a skip judgment request by lot processing start information. In this example, it is judged whether a process of a semiconductor product AAAA should be skipped or not.

Next as shown in FIG. 23, in response to this request, the skip judgment yes/no section 72 searches into the skip condition database 77 in which types of semiconductor devices to be manufactured, names of judgment plug-in used for the skip judgment of a process, among others, are registered, and extracts a judgment plug-in 80 corresponding to the process. This skip condition database 77 holds registration of types of semiconductor products, skip judgment yes/no information (information about whether skip judgment itself should be done or not) for respective processes, and names off logics (names of judgment logic-in) used for skip judgment, and the judgment plug-in 80 is searched out by the name of the judgment plug-in. In this example, the name of the judgment plug-in is SAKURA.

Figure 25:
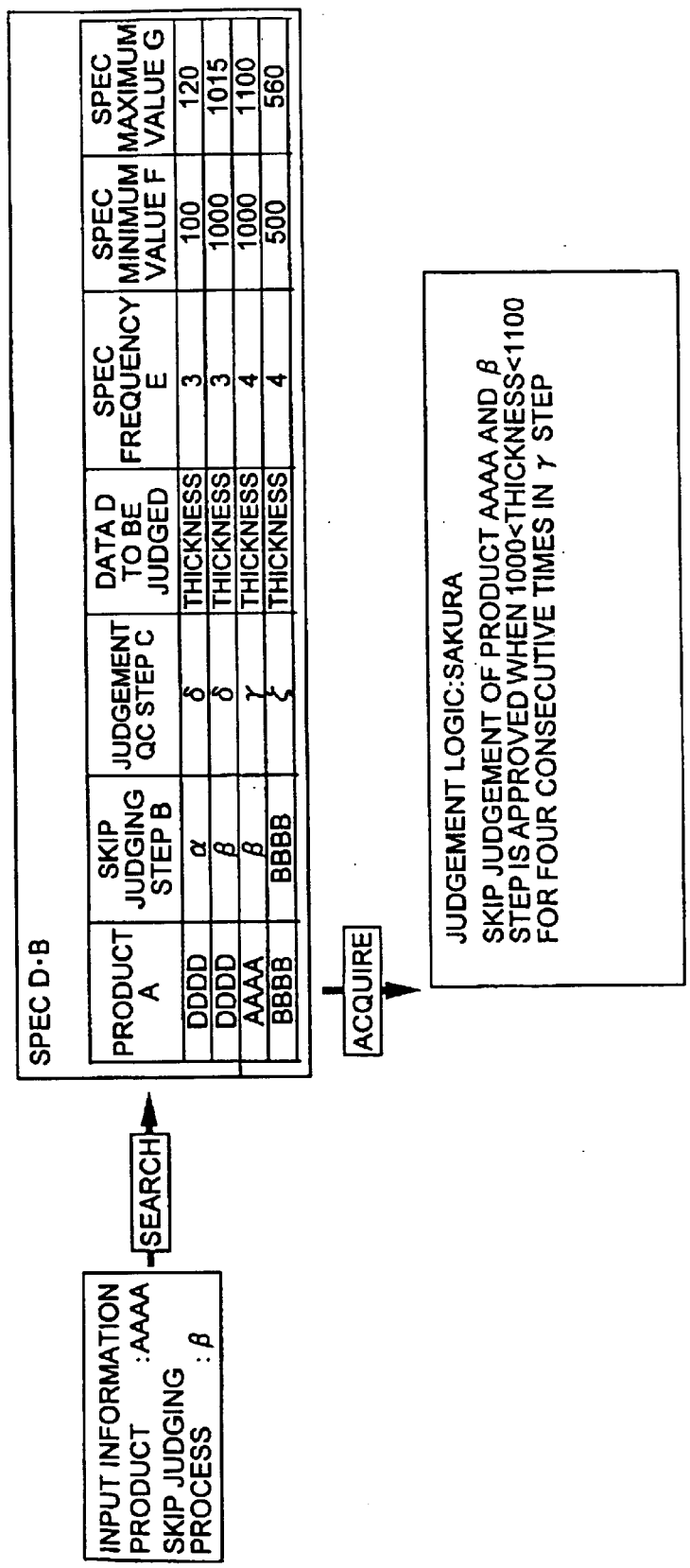
FIG. 25 is a diagram showing operations of a spec search section in the fifth embodiment of the invention.

After that, the judgment execute section 73 starts up SAKURA from the corresponding judgment plug-in 80. At that time, the judgment logic of the judgment plug-in 80 has no numerical values in judgment specs D, E, F and G as shown in FIG. 24. Therefore, as shown in FIG. 25, the spec detector 82 acquires judgment specs as references of skip judgment from the spec database 81 on the basis of the input information, and substitutes them for the judgment logic. In this example, if the thickness of the film to be judged is in the range of 1000 through 1100 angstrom four consecutive times, skipping of the process is approved.

Figure 26:
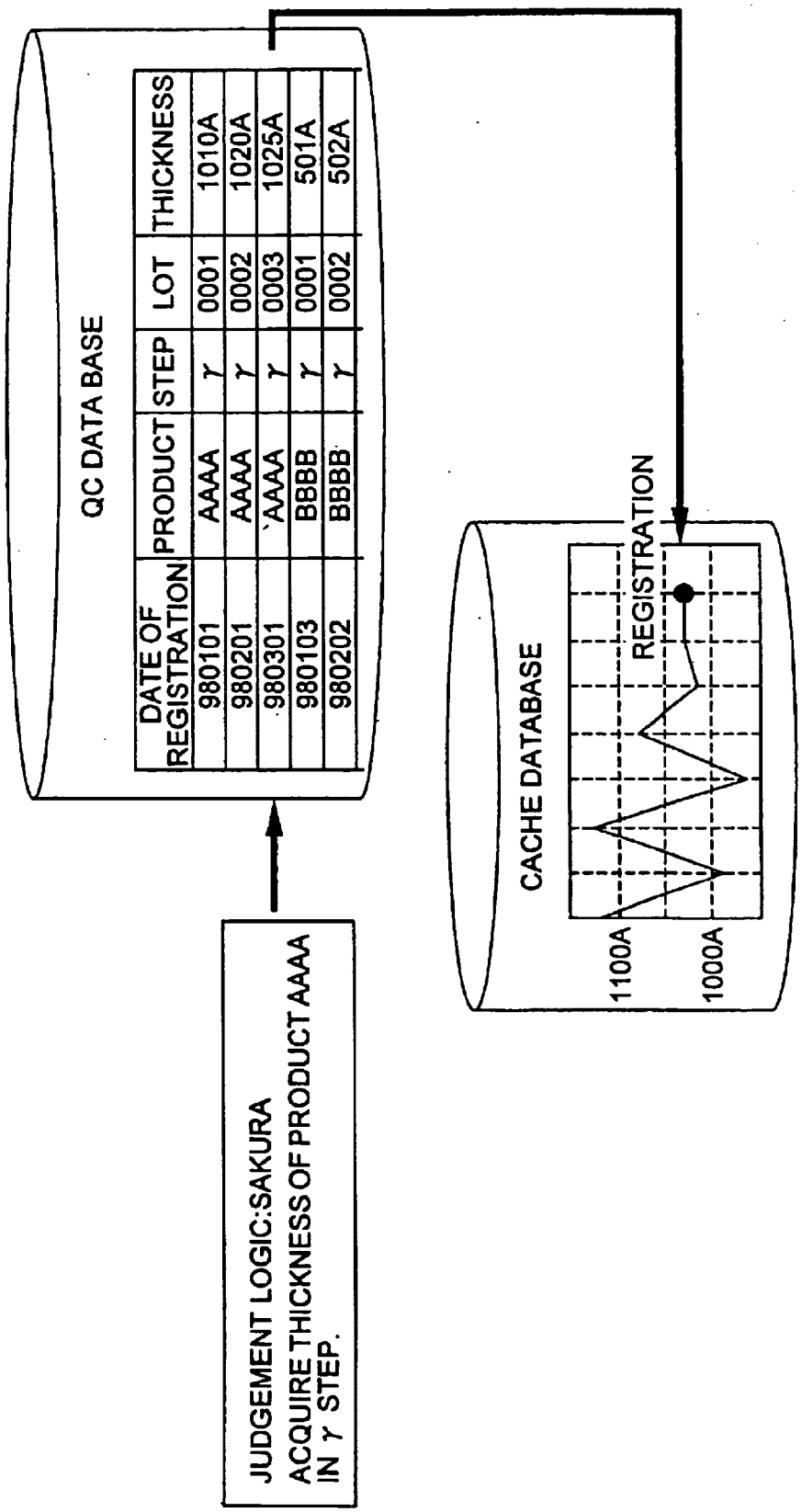
FIG. 26 is a diagram showing operations of a target process QC result extractor in the fifth embodiment of the invention.

Next as shown in FIG. 26, the QC result extractor 83 acquires prior quality control information about the target process from the QC (quality control) database 93, and registers (stores) it in the cache database 85.

Figure 27:
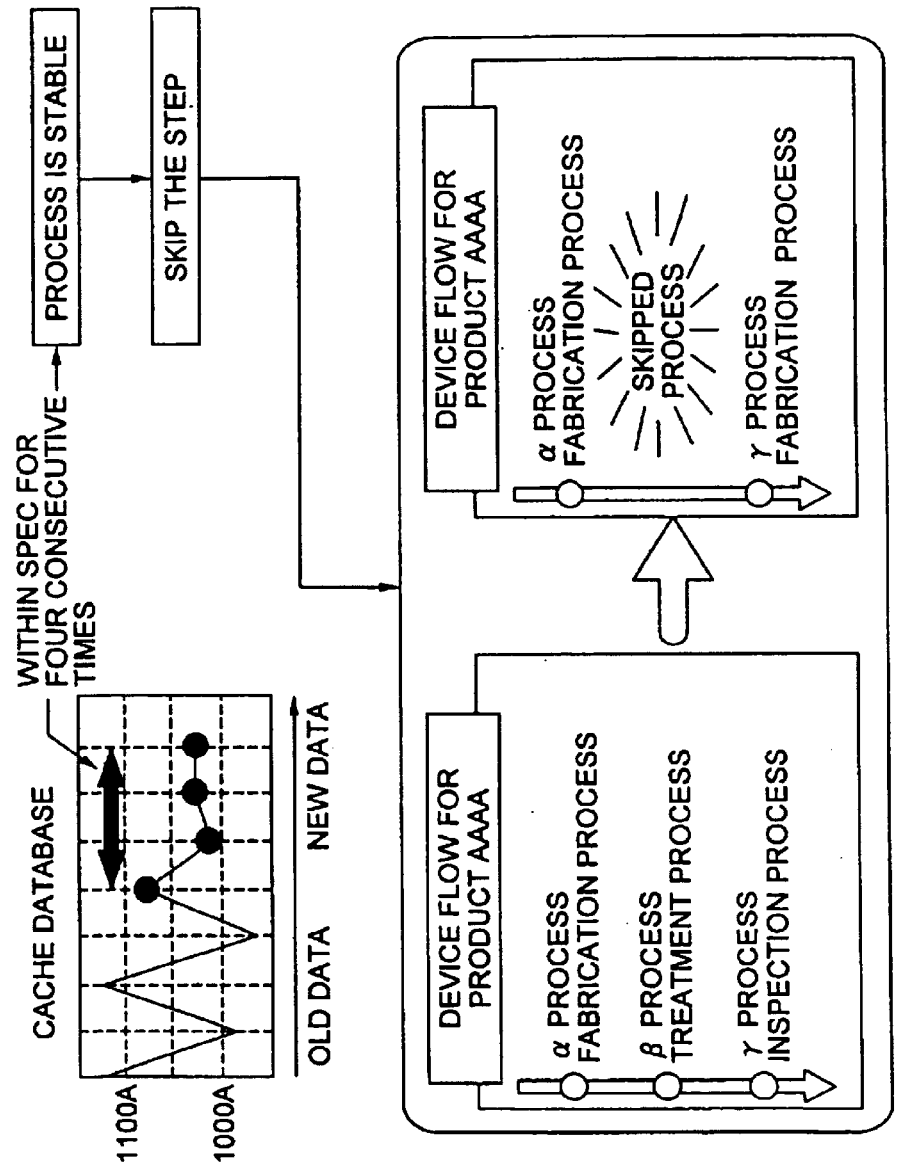
FIG. 27 is a diagram showing operations of a target process skip judging section and a skip execute section in the fifth embodiment of the invention.

Next as shown in FIG. 27, the skip judging section 84 judges from data in the cache database 85 whether the target process should be skipped or not, and sends its judgment result to the judgment result receiver 74. In receipt of it, the skip execute section 75 executes skipping of the process. That is, in this example, the process β (for example, cleansing process) is skipped.

It is also possible to configure the system to cancel skipping of this step β. That is, in the inspection process which is the process γ next to the process β, if an amount of dust beyond a predetermined reference range is detected, it is possible not to skip the cleansing process as the process β.

Figure 28:
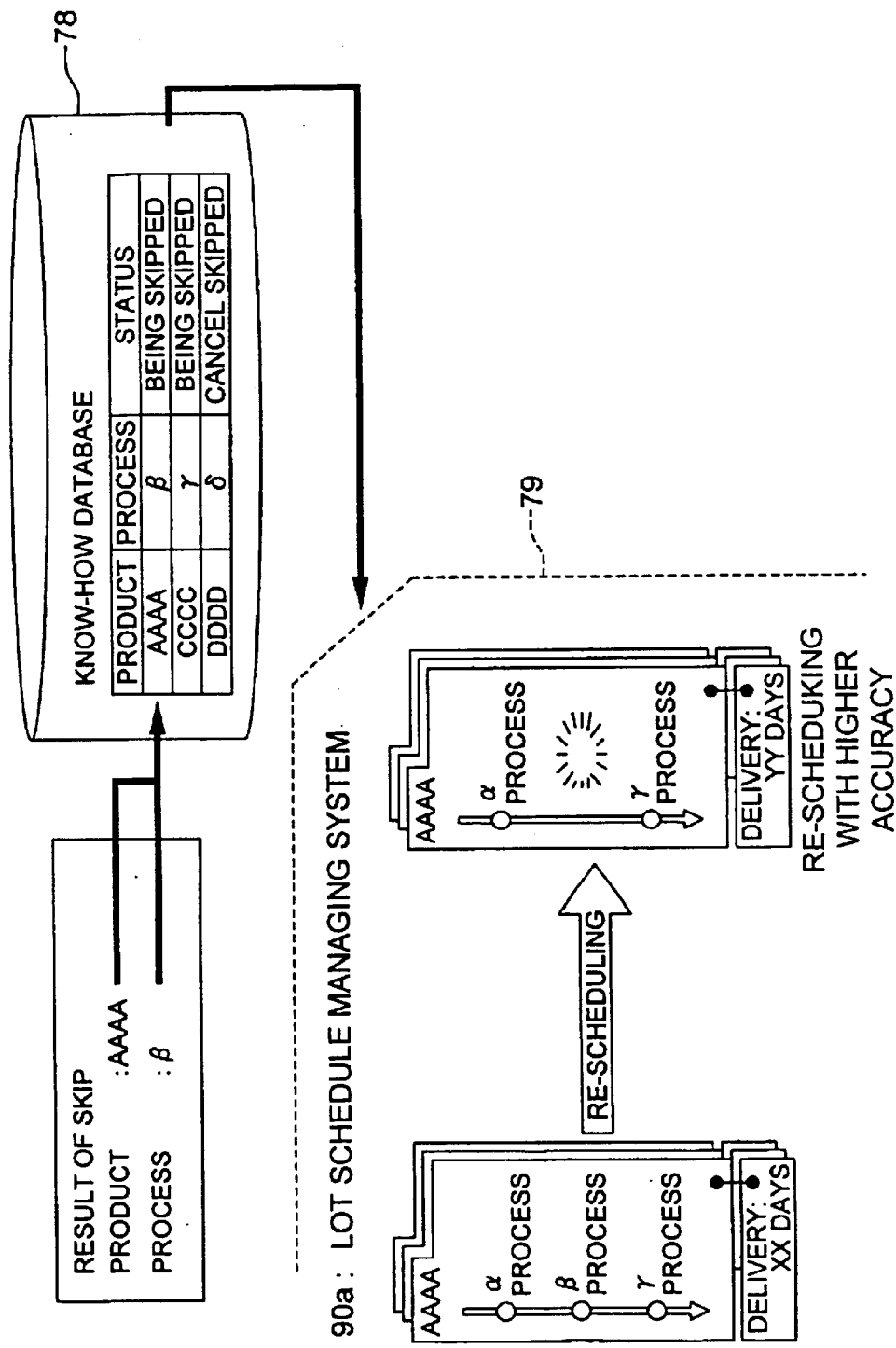
FIG. 28 is a diagram which shows an example of operations in case of recording the history of skip judgment as know-how data and supplying information to an external device.
Figure 29:
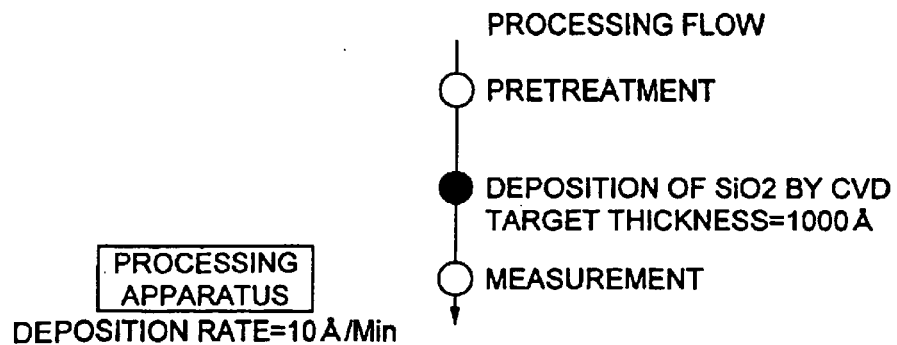
FIG. 29 is a diagram showing a process flow in a conventional system.
Figure 30:
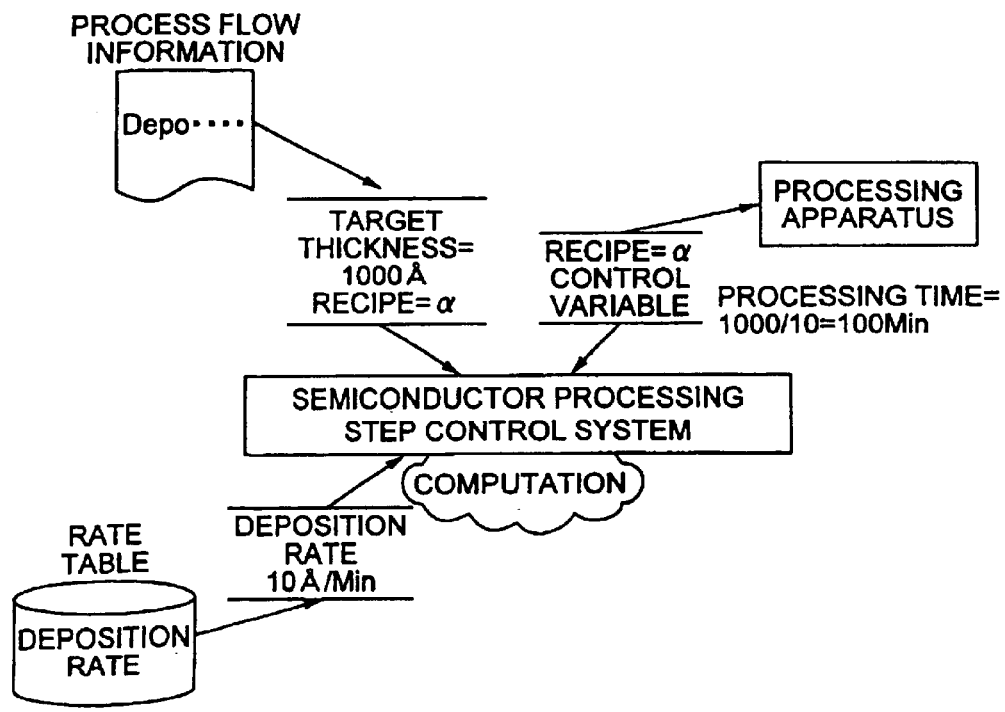
FIG. 30 is a diagram showing a flow of process control in a conventional system.
Figure 32:
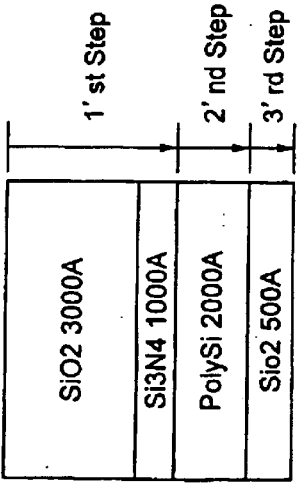
FIG. 32 is a diagram showing a conventional processing time computation method used for etching a plurality of films.
Figure 33:
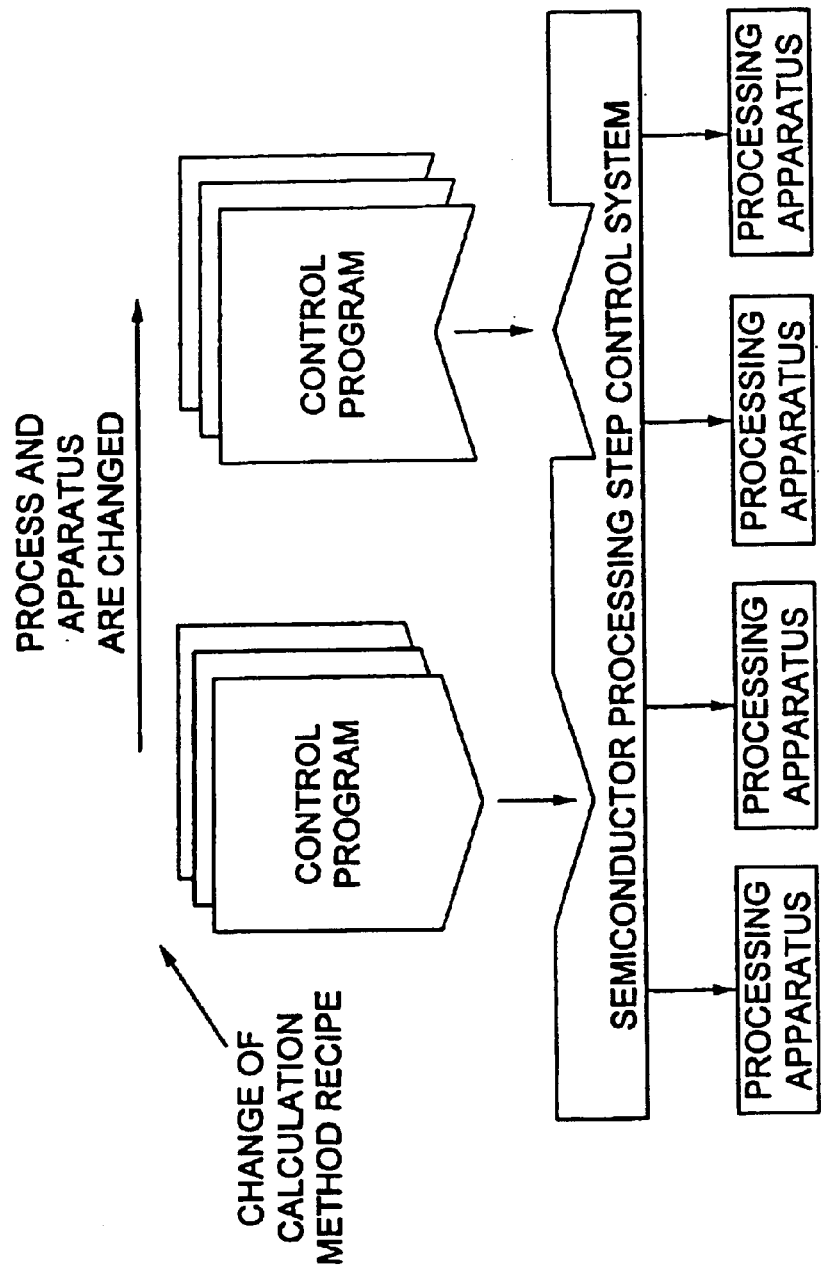
FIG. 33 is a diagram showing a conventional concept of configuration of a semiconductor processing process control system.

History of execution of skip judgment by the judgment result register section 76 is recorded in the know-how database 78. Then the history is supplied to the external system 90 via the know-how database 78. An example of use of this history is shown in FIG. 28. In this example, a lot schedule managing system 90a is shown as the external system 90. The lot schedule managing system 90a executes re-scheduling on the basis of the history in the know-how database 78. That is, by skipping the process β, the number of steps of the entire process flow is reduced. Therefore, the delivery time of the products can be shortened. In the example of FIG. 28, the delivery period, XX days, can be shortened to YY days. In this manner, by using history information in the know-how database 78, high-accuracy process schedule management is possible.

As explained above, since the semiconductor processing process control system according to the embodiment is so configured that the judgment plug-in 80 acquires the past quality information from the QC database 93 and judges from a judgment spec in the spec database 81 whether the past quality information satisfies the condition for step skip, it is possible to accurately judge whether a process should be skipped or not, while ensuring a high reliability of the finished result. As a result, the term of works and the lot manufacturing cost can be reduced.

Further, since the judgment plug-in 80 is detachable relative to the step skip device 70, the logic for judging the process to be skipped or not from the finished result can be provided from outside. Therefore, logics for judgment can be modified and added flexibly.

The invention can be modified in various modes, not limited to the above-explained embodiments. For example, at least one of the control computation program 211 and the actual processing totaling program 212 of the control variable computation program 210 shown in FIG. 6 can be omitted, if it is not necessary.

Furthermore, the above-explained processing can be distributed by recording procedures necessary for each processing on a recording medium, which can be read out by a computer. In this case, by using a computer to read out and execute programs recorded on the recording medium, the semiconductor processing process control system according to the invention can be realized.

As described above, according to the invention, since the semiconductor processing process control system is constructed by dividing it into the process controller main body for controlling processes for semiconductor processing independently from semiconductor processing devices and processing targets, and the control variable computing section for obtaining a semiconductor processing device and control variables of the semiconductor processing device which meet a processing target, and by configuring the control variable computing section to be detachably coupled to the process controller main body, the system can flexibly, quickly cope with changes in required process, formula for calculation of control variables and required processing device. Therefore, the production line can be activated early for producing a small amount of many types of semiconductor devices.

Furthermore, since the control variable computation method section is configured to be detachably connected to the process controller main body and to detachably receive the control variable computation means inserted therein, control over a plurality of processes can be executed, separating it into respective processes. Therefore, even upon the need for a new operation mode or modification among processes, the required modification can be made easily, and automation of control variable computation in the production line of semiconductor devices can be made quickly.

What is claimed is:

1. A semiconductor processing process control system for controlling a plurality of processes for semiconductor processing, comprising:

a skip judgment request receiving section which receives a request for judgment whether a process can be skipped or not;

a plurality of judgment plug-in each having a step skip judgment logic for judging whether a certain process can be skipped or not;

a skip judgment yes/no section for searching out a judgment plug-in corresponding to a process to be judged, which is received by the skip judgment request receiving section, from the plurality of judgment plug-in;

a judgment execute section which activates the judgment plug-in searched out by the skip judgment yes/no section and makes the judgment plug-in judge whether the one process can be skipped or not, on the basis of the step skip judgment logic;

a judgment result receiving section which receives from the activated judgment plug-in a result of judgment whether the one process can be skipped or not; and a skip execute section which effects skipping of the one process when the result of judgment indicates that the process can be skipped.

2. The semiconductor processing process control system according to claim 1 wherein each the judgment plug-in includes:

a spec database holding a set of reference specs which are references for judgment whether a process can be skipped or not;

a spec search section responsive to an instruction from the judgment execute section to acquire a reference spec from the spec database;

a QC result extracting section which acquires quality information from a quality control database; and a skip judging section, which receives, the reference spec from the spec search section and the quality information from the QC result extracting section to judge whether a process can be skipped or not on the basis of the reference spec and the quality information.

3. The semiconductor processing process control system according to claim 2 further comprising:

a know-how database which stores results of judgment whether a process can be skipped or not; and a transmitting section that sends data in the know-how database to an external system.

4. A method for controlling a semiconductor processing process control system configured to control a plurality of processes for semiconductor processing, comprising:

a skip judgment request receiving step for receiving a request for judgment whether a process can be skipped or not;

a search step for searching out a judgment plug-in corresponding to a process to be judged, from a plurality of judgment plug-ins, each judgment plug-in having a step skip judgment logic for judging whether a certain process can be skipped or not;

a judgment execute step for activating the judgment plug-in searched out to judge whether the one process can be skipped or not;

a judgment result receiving step for receiving from the activated judgment plug-in a result of judgment whether the one process can be skipped or not; and a skip execute step which effects skipping of the one step when the result of judgment indicates that the process can be skipped.

* * * * *